United States Patent
Araki et al.

(10) Patent No.: US 10,612,651 B2
(45) Date of Patent: Apr. 7, 2020

(54) LOCK-UP CLUTCH CONTROL DEVICE FOR VEHICLE, AND LOCK-UP CLUTCH CONTROL METHOD

(71) Applicants: JATCO Ltd, Fuji-shi, Shizuoka (JP); NISSAN MOTOR CO., LTD., Yokohama-shi, Kanagawa (JP)

(72) Inventors: Toshimitsu Araki, Ebina (JP); Hideshi Wakayama, Hadano (JP); Kouji Saitou, Machida (JP); Seiji Kasahara, Atsugi (JP); Tetsuya Izumi, Ayase (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 115 days.

(21) Appl. No.: 15/758,140

(22) PCT Filed: Aug. 31, 2016

(86) PCT No.: PCT/JP2016/075394
§ 371 (c)(1),
(2) Date: Mar. 7, 2018

(87) PCT Pub. No.: WO2017/043380
PCT Pub. Date: Mar. 16, 2017

(65) Prior Publication Data
US 2018/0216729 A1    Aug. 2, 2018

(30) Foreign Application Priority Data
Sep. 11, 2015  (JP) .................................. 2015-180174

(51) Int. Cl.
F16H 61/14   (2006.01)
F16D 48/02   (2006.01)
(Continued)

(52) U.S. Cl.
CPC .......... F16H 61/143 (2013.01); F16D 48/02 (2013.01); F16D 48/066 (2013.01);
(Continued)

(58) Field of Classification Search
None
See application file for complete search history.

(56) References Cited

FOREIGN PATENT DOCUMENTS

| JP | 2002-295529 A | 10/2002 |
| JP | 2012-021549 A | 2/2012 |
| JP | 2013-133878 A | 7/2013 |

OTHER PUBLICATIONS

JP2013133878 translation (Year: 2013).*

* cited by examiner

Primary Examiner — Timothy Hannon
(74) Attorney, Agent, or Firm — Foley & Lardner LLP

(57) ABSTRACT

In a vehicle equipped with a torque converter 4 having a lock-up clutch (3), learning control for obtaining a learning value (L_n) on the basis of meet-point information, with which the lock-up clutch (3) initiates torque transmission, is carried out. When the lock-up clutch (3) experiences a transition to an engaged state during travel, a meet-point learning control unit (12c) calculates an LU transmission torque estimate on the basis of the difference between the engine torque (engine torque signal value Te) and the torque converter transmission torque ($\tau \cdot Ne^2$). Excess clutch capacity is detected when the LU transmission torque estimate is greater than an excess capacity determination transmission torque threshold within a prescribed amount of time after an initial pressure (P_n) based on the learning value (L_n) is instructed. When excess clutch capacity is detected, a learning value correction that reduces the learning value (L_n) is carried out.

8 Claims, 15 Drawing Sheets

(51) Int. Cl.
   *F16D 48/06* (2006.01)
   *F16H 61/00* (2006.01)
   *F16H 59/14* (2006.01)

(52) U.S. Cl.
   CPC . *B60Y 2300/421* (2013.01); *F16D 2500/1026* (2013.01); *F16D 2500/1045* (2013.01); *F16D 2500/10412* (2013.01); *F16D 2500/1107* (2013.01); *F16D 2500/3065* (2013.01); *F16D 2500/30421* (2013.01); *F16D 2500/50251* (2013.01); *F16H 59/14* (2013.01); *F16H 2059/147* (2013.01); *F16H 2061/0087* (2013.01); *F16H 2061/146* (2013.01)

LOCK-UP CLUTCH CONTROL DEVICE FOR VEHICLE, AND LOCK-UP CLUTCH CONTROL METHOD

TECHNICAL FIELD

The present invention relates to a vehicular lockup clutch control device and a vehicular lockup clutch control method configured to perform a control to obtain a learning value based on information about a meeting point at which a lockup clutch starts torque transmission.

BACKGROUND ART

Conventionally, a method is disclosed which is configured to: compare an engine rotational speed with a clutch input rotational speed when a vehicle start clutch is engaged gradually; and learn as a torque transmission point a clutch supply hydraulic pressure when the clutch input rotational speed falls by a predetermined rotational speed with respect to the engine rotational speed (see a patent document 1, for example).

A lockup clutch provided in a torque converter is also required to strike a balance between quick engagement for enhancement of fuel efficiency and suppression of driver's uncomfortable feel due to change of vehicle behavior at engagement. For solution, it is conceivable that a torque transmission point of the lockup clutch is also learned, and the learning control for the vehicle start clutch is applied to the lockup clutch.

However, if for ensuring the frequency of learning, the learning control for the torque transmission point of the lockup clutch is performed while the vehicle is running, it is possible that the engine rotational speed is changed by a factor other than the state of engagement of the lockup clutch, causing erroneous learning. The erroneous learning may cause a problem that the lockup clutch is rapidly engaged to change the vehicle behavior and cause a driver to feel uncomfortable.

The present invention is made with attention to the problem described above, and is targeted for providing a vehicular lockup clutch control device and a vehicular lockup clutch control method capable of suppressing an initial pressure, which is supplied to a lockup clutch, from causing a state of capacity excess, when a learning control is performed based on information about a meeting point at which the lockup clutch starts torque transmission.

PRIOR ART DOCUMENT(S)

Patent Document(s)

Patent Document 1: JP 2002-295529 A

SUMMARY OF THE INVENTION

In order to accomplish the target described above, for a vehicle where a torque converter is mounted between an engine and a transmission, wherein the torque converter includes a lockup clutch, the present invention comprises: a lockup control part configured to control engagement of the lockup clutch; and a meeting point learning control part configured to perform a learning control of obtaining a learning value based on information about a meeting point at which the lockup clutch starts torque transmission, wherein the meeting point learning control part is further configured to: calculate a lockup transmission torque estimated value based on a difference between an engine torque and a torque converter transmission torque, when the lockup clutch experiences a transition into engaged state while the vehicle is running; detect a state of clutch capacity excess, in response to a situation where the lockup transmission torque estimated value exceeds a capacity excess determination transmission torque threshold value in a predetermined time period after commanding of an initial pressure based on the learning value; and perform an operation of learning value correction of reducing the learning value in response to detection of the state of clutch capacity excess.

Accordingly, when the lockup clutch experiences a transition into engaged state while the vehicle is running, a state of clutch capacity excess is detected in response to a situation where the lockup transmission torque estimated value exceeds the capacity excess determination transmission torque threshold value in the predetermined time period after commanding of the initial pressure based on the learning value. In response to detection of the state of clutch capacity excess, the operation of learning value correction is performed to reduce the learning value. While the lockup transmission torque is monitored, it is assumed that the initial pressure is excessive if the lockup transmission torque increases rapidly, and it is assumed that the initial pressure is not excessive if the lockup transmission torque increases at a valid rate of increase. Accordingly, the lockup transmission torque estimated value is used to detect a state of clutch capacity excess, in response to a situation where the lockup transmission torque estimated value exceeds the capacity excess determination transmission torque threshold value within the predetermined time period after commanding of the initial pressure based on the learning value. A capacity excess determination logic is employed wherein in response to detection of the state of clutch capacity excess, the learning value correction is performed to reduce the learning value before entrance into an unbearable shock possible region. This serves to prevent the initial pressure, which is supplied to the lockup clutch, from causing a state of capacity excess, when the learning control is performed based on the information of the meeting point at which the lockup clutch starts torque transmission.

MODE(S) FOR CARRYING OUT THE INVENTION

Figure 1:
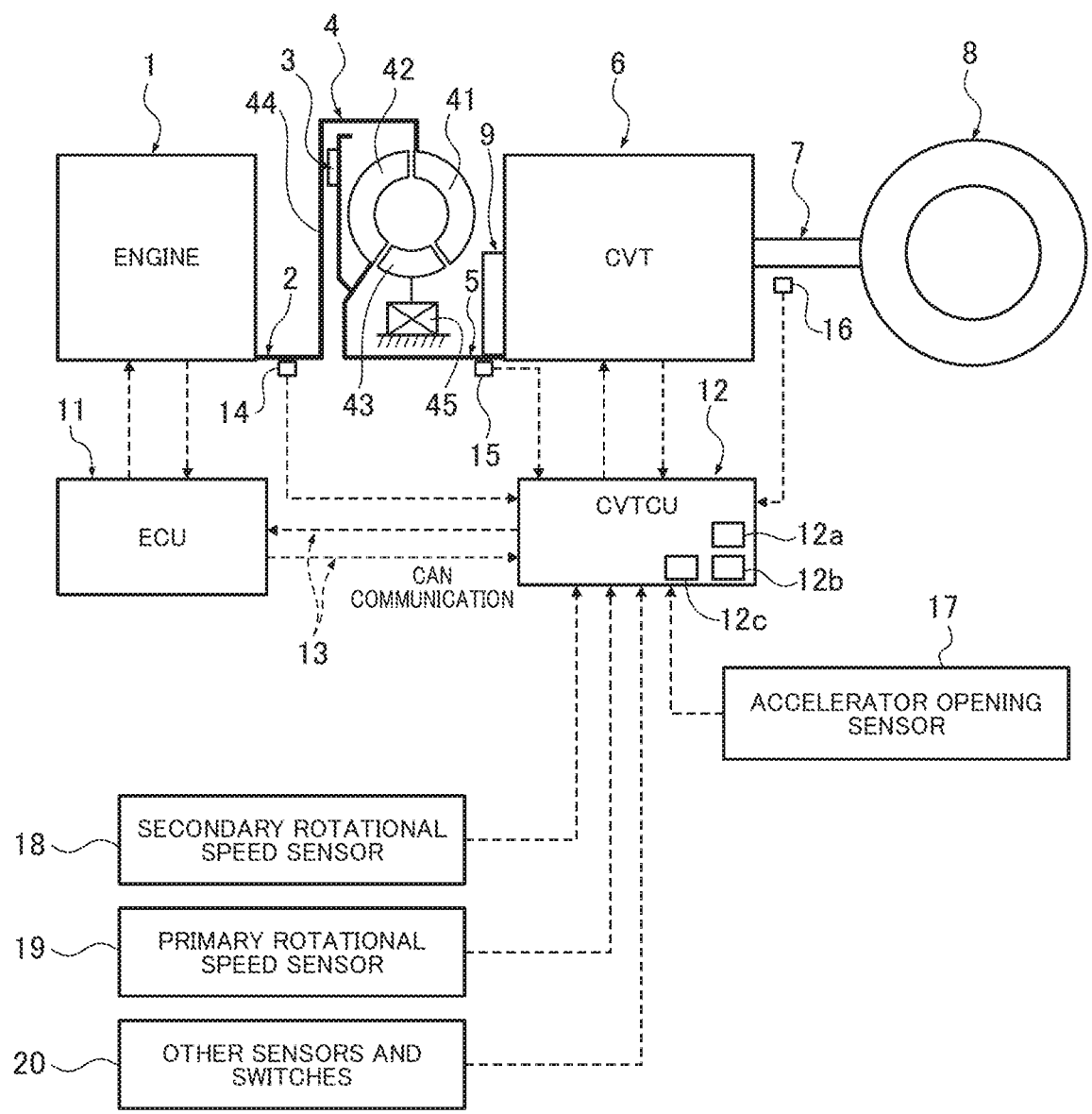
FIG. 1 is a whole system diagram showing an engine vehicle to which a lockup clutch control device and a lockup clutch control method according to a first embodiment are applied.

The following describes the best mode for carrying out a vehicular lockup clutch control device and a vehicular lockup clutch control method mode according to the present invention, with reference to a first embodiment shown in the drawings.

First Embodiment

First, the following describes configuration of the lockup clutch control device and lockup clutch control method according to the first embodiment, applied to an engine vehicle where a continuously variable transmission and a torque converter with a lockup clutch are mounted. The following describes configuration of the lockup clutch control device of the engine vehicle according to the first embodiment, separately in sections [Whole System Configuration] and [Configuration of Process of Meeting Point Learning Control].

[Whole System Configuration]

FIG. 1 shows the engine vehicle to which the lockup clutch control device and lockup clutch control method according to the first embodiment are applied. The following describes whole system configuration with reference to FIG. 1.

As shown in FIG. 1, a vehicle drive system includes an engine 1, an engine output shaft 2, a lockup clutch 3, a torque converter 4, a transmission input shaft 5, a continuously variable transmission (CVT) 6, a drive shaft 7, and driving wheels 8.

Lockup clutch 3 is accommodated in torque converter 4, and is configured to be disengaged to connect the engine 1 to continuously variable transmission 6 via torque converter 4, and engaged to connect the engine output shaft 2 rigidly to transmission input shaft 5. Lockup clutch 3 is controlled among engaged state, slip-engaged state, and disengaged state, by an LU actual hydraulic pressure which is produced based on an LU command pressure from a CVT control unit 12 described below. Transmission input shaft 5 is provided with an oil pump 9 configured to be driven by a driving force transmitted from engine 1 via torque converter 4.

Torque converter 4 includes a pump impeller 41, a turbine runner 42, and a stator 43, wherein turbine runner 42 is arranged to face the pump impeller 41, and wherein stator 43 is arranged between pump impeller 41 and turbine runner 42. Torque converter 4 is a fluid coupling filled with working oil which circulates through each blade of turbine runner 42 and stator 43 and thereby transmits torque. Pump impeller 41 is coupled to engine output shaft 2 via a converter cover 44 whose inner surface serves as an engagement surface of lockup clutch 3. Turbine runner 42 is connected to transmission input shaft 5. Stator 43 is connected to a stationary component (transmission case, etc.) via a one-way clutch 45.

Continuously variable transmission 6 is a belt-type continuously variable transmission configured to continuously control a transmission ratio by varying a diameter of contact between a belt and a primary pulley and a diameter of contact between the belt and a secondary pulley. Output rotation of continuously variable transmission 6 after speed change is transmitted to driving wheels 8 via drive shaft 7.

As shown in FIG. 1, a vehicle control system includes an engine control unit (ECU) 11, CVT control unit (CVTCU) 12, and a CAN communication line 13. For input of information, the control system includes an engine rotational speed sensor 14, a turbine rotational speed sensor (CVT input rotational speed sensor) 15, a CVT output rotational speed sensor (vehicle speed sensor) 16, an accelerator opening sensor 17, a secondary rotational speed sensor 18, a primary rotational speed sensor 19, and other sensors and switches 20.

Engine control unit 11 is configured to perform various controls about engine 1, such as fuel injection control, fuel cut control, etc. for engine 1. Engine control unit 11 generates an engine torque signal, based on characteristics of relationship between engine rotational speed and torque of engine 1, engine rotational speed, fuel injection quantity, etc. In response to a request from CVT control unit 12, engine control unit 11 informs CVT control unit 12 of the engine torque signal.

CVT control unit 12 is configured to perform a shift control to control the transmission ratio of continuously variable transmission 6, a lockup clutch control to shift the lockup clutch 3 among engaged state, slip-engaged state, and disengaged state, etc. CVT control unit 12 is further configured to perform a meeting point learning control to obtain a learning value of a meeting point (LU command pressure) at which lockup clutch 3 is engaged to start torque transmission.

Figure 2:
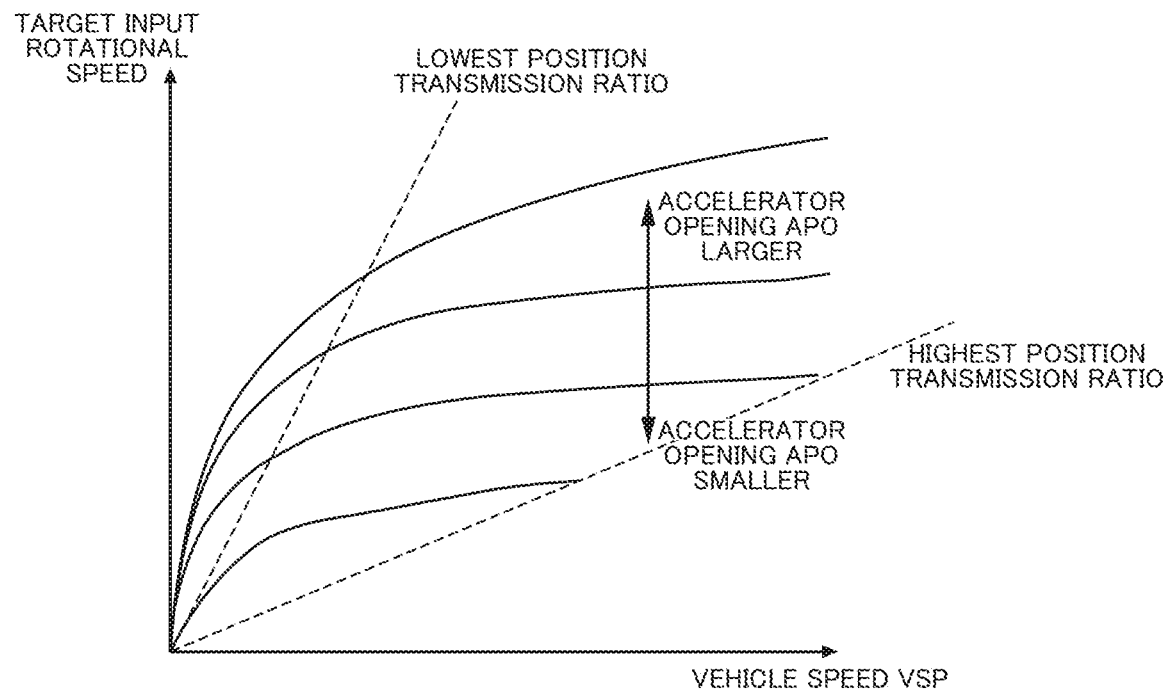
FIG. 2 is a shift map diagram showing an example of shift map employed in a shift control of a CVT control unit.

CVT control unit 12 includes a shift control part 12a configured to perform a basic control of the shift control. For example, with a shift map shown in FIG. 2, shift control part 12a outputs a shift command to vary the transmission ratio and thereby obtain a target input rotational speed (target primary rotational speed), when an operating point, which is defined by vehicle speed VSP and accelerator opening APO, moves to a lower position transmission ratio side or a higher position transmission ratio side.

Figure 3:
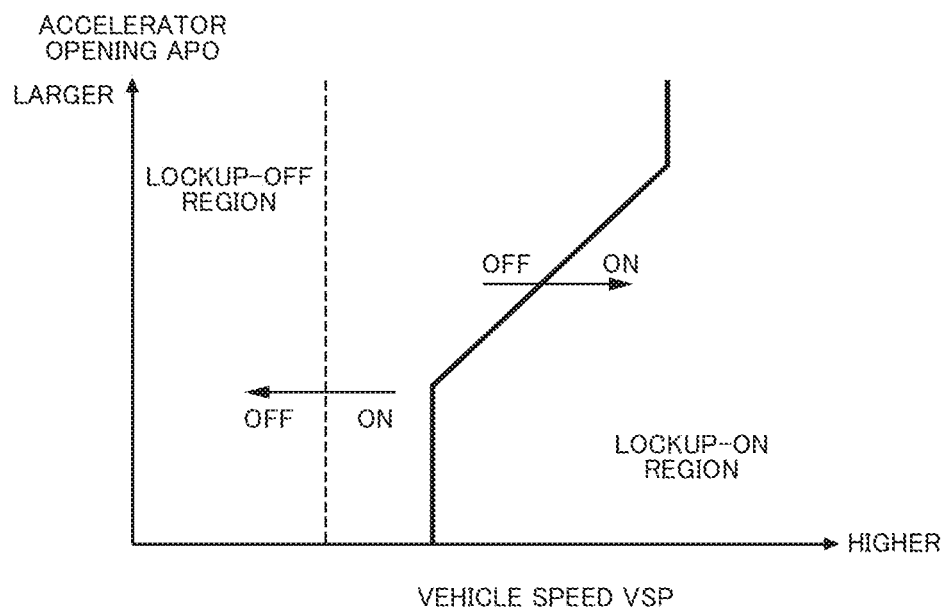
FIG. 3 is a lockup map diagram showing an example of lockup map employed in a lockup clutch control of the CVT control unit.

CVT control unit 12 includes a lockup control part 12b configured to perform a basic control of the lockup clutch control, for enhancement of fuel efficiency while the vehicle is driven with depression of an accelerator, by using a lockup map shown in FIG. 3. Specifically, lockup control part 12b outputs an LU engagement request to engage the disengaged lockup clutch 3 in response to an event that the operating point defined by vehicle speed VSP and accelerator opening APO crosses an OFF→ON line in FIG. 3. On the other hand, lockup control part 12b outputs an LU disengagement request to disengage the engaged lockup clutch 3 in response to an event that the operating point defined by vehicle speed VSP and accelerator opening APO crosses an ON→OFF line in FIG. 3.

CVT control unit 12 includes a meeting point learning control part 12c configured to perform the meeting point learning control. The meeting point learning control obtains a meeting point learning value (LU command pressure) which is employed as information to determine an initial pressure (=[meeting point learning value]−[offset pressure]) for start of engagement of lockup clutch 3.

[Configuration of Process of Meeting Point Learning Control]

FIGS. 4 to 7 show a flow of process of meeting point learning control performed by meeting point learning control part 12c of CVT control unit 12 according to the first embodiment (meeting point learning control means). The following describes steps of the process of meeting point learning control with reference to a flow of meeting point detection (S1 to S20) shown in FIGS. 4 and 5, a flow of capacity excess detection determination (S21 to S27) shown in FIG. 6, and a flow of learning value update (S28 to S39) shown in FIG. 7.

The process of meeting point learning control is started in response to output of an LU engagement request during lockup clutch control, and performed for each experience of LU engagement operation of engaging the disengaged lockup clutch 3. In FIGS. 4 to 7, "LU" is an abbreviation of "lockup", and "LU/C" is an abbreviation of "lockup clutch", and "T/C" is an abbreviation of "torque converter".

At Step S1, following determination at Step S4 that an LU transmission torque estimated value change quantity≤an edge detection threshold value, or determination at Step S11 that CAPA=0, or determination at Step S17 that LU/C is not engaged, the meeting point learning control part 12c estimates an LU transmission torque, and proceeds to Step S2. An LU transmission torque estimated value, which is an estimated value of the LU transmission torque, is calculated generally as a difference between engine torque and torque converter transmission torque. Specifically, the LU transmission torque estimated value is calculated by using the following equation:

$$[\text{LU transmission torque estimated value}] = Te - \tau \cdot Ne^2 - OPLOS \quad (1)$$

where

Te: an engine torque signal value,

τ: a torque capacity coefficient (given),

Ne: an engine rotation signal value (from engine rotational speed sensor 14), and OPLOS: an oil pump friction loss torque.

Engine torque signal value Te is obtained from engine control unit 11 by outputting a request for information. Torque capacity coefficient τ is given depending on speed ratio, by using characteristics of torque capacity coefficient with respect to speed ratio. The term of $\tau \cdot Ne^2$ in equation (1) represents a torque converter transmission torque. Oil pump friction loss torque OPLOS is calculated by the following equation:

$$OPLOS = PL \cdot [\text{O/P specific discharge quantity}] + Ne \cdot [\text{coefficient of engine rotation dependency}] \quad (2)$$

where

PL: a line pressure,

[O/P specific discharge quantity]: a discharge quantity of O/P on engine shaft, and

[coefficient of engine rotation dependency]: a coefficient determined experimentally or the like.

At Step S2, following the estimation of the LU transmission torque at Step S1, the meeting point learning control part 12c calculates a quantity of change of the LU transmission torque estimated value, and proceeds to Step S3. The LU transmission torque estimated value change quantity is a quantity of change of the LU transmission torque estimated value per unit time, and is calculated by using an equation of [LU transmission torque estimated value change quantity]=[LU transmission torque estimated value (present)]−[LU transmission torque estimated value (predetermined time period before)].

At Step S3, following the calculation of the LU transmission torque estimated value change quantity at Step S2, the meeting point learning control part 12c determines whether or not a monotonous increase determination flag TLUEDGEFLAG is equal to 1. In case of YES (TLUEDGEFLAG=1), meeting point learning control part 12c proceeds to Step S7. In case of NO (TLUEDGEFLAG=0), meeting point learning control part 12c proceeds to Step S4. The monotonous increase determination flag TLUEDGEFLAG is set at Step S5, when the LU transmission torque estimated value change quantity exceeds the edge detection threshold value.

At Step S4, following the determination at Step S3 that TLUEDGEFLAG=0, the meeting point learning control part 12c determines whether or not the LU transmission torque estimated value change quantity>the edge detection threshold value. In case of YES (the LU transmission torque estimated value change quantity>the edge detection threshold value), meeting point learning control part 12c proceeds to Step S5. In case of NO (the LU transmission torque estimated value change quantity≤the edge detection threshold value), meeting point learning control part 12c returns to Step S1. The edge detection threshold value is set to a value of the LU transmission torque estimated value change quantity with which it can be determined that the LU transmission torque estimated value has entered a tendency of increase, even with influences of fluctuations of rotational speed, torque, etc. of engine 1, namely, a value slightly above a quantity of change of the LU transmission torque estimated value corresponding to a quantity of such fluctuations.

At Step S5, following the determination at Step S4 that the LU transmission torque estimated value change quantity>the edge detection threshold value, the meeting point learning control part 12c sets the monotonous increase determination flag TLUEDGEFLAG (TLUEDGEFLAG=1), and proceeds to Step S6.

At Step S6, following the setting of monotonous increase determination flag TLUEDGEFLAG at Step S5, the meeting point learning control part 12c memorizes an LU transmission torque estimated value TLUEDGE and an LU command value LUPRSEDGE when it is determined that the LU transmission torque estimated value change quantity>the edge detection threshold value, and proceeds to Step S8.

At Step S7, following the determination at Step S3 that TLUEDGEFLAG=1, the meeting point learning control part 12c determines whether or not the LU transmission torque estimated value change quantity>a monotonous increase determination threshold value. In case of YES (the LU transmission torque estimated value change quantity>the monotonous increase determination threshold value), meeting point learning control part 12c proceeds to Step S8. In case of NO (the LU transmission torque estimated value change quantity≤the monotonous increase determination threshold value), meeting point learning control part 12c proceeds to Step S40 in the flow of learning value update in FIG. 7. The monotonous increase determination threshold value is set to a value for determining that the LU transmission torque estimated value change quantity is increasing monotonously, namely, a value for excluding situations where the LU transmission torque estimated value shows a small gradient of increase or shows no increase but is unchanged.

At Step S8, following the memorization of the LU transmission torque estimated value TLUEDGE and LU command value LUPRSEDGE at Step S6, or the determination at Step S7 that the LU transmission torque estimated value change quantity>the monotonous increase determination threshold value, the meeting point learning control part 12c calculates a calculation variation of the LU transmission torque estimated value, and proceeds to Step S9. The calculation variation of the LU transmission torque estimated value is a total sum of variation of engine torque signal value Te and variation of the torque converter transmission torque ($=\tau \cdot Ne^2$) due to variation of torque capacity coefficient $\tau$.

At Step S9, following the calculation of the calculation variation of the LU transmission torque estimated value at Step S8, the meeting point learning control part 12c determines whether or not the LU transmission torque estimated value exceeds the calculation variation of the LU transmission torque estimated value. In case of YES (the LU transmission torque estimated value>the calculation variation of the LU transmission torque estimated value), meeting point learning control part 12c proceeds to Step S10. In case of NO (the LU transmission torque estimated value≤the calculation variation of the LU transmission torque estimated value), meeting point learning control part 12c proceeds to Step S11. Step S9 serves as a determination step for confirming the occurrence of LU capacity. Namely, meeting point learning control part 12c determines that the LU transmission torque estimated value passes through the calculation variation of the LU transmission torque estimated value, based on determination that the LU transmission torque estimated value≤the calculation variation of the LU transmission torque estimated value during the last operation, and the LU transmission torque estimated value>the calculation variation of the LU transmission torque estimated value during the present operation. The determination that the LU transmission torque estimated value passes through the calculation variation of the LU transmission torque estimated value, serves to confirm detection of the clutch meeting point (point where the LU capacity occurs) within the calculation variation of the LU transmission torque estimated value.

At Step S10, following the determination at Step S9 that the LU transmission torque estimated value>the calculation variation of the LU transmission torque estimated value, the meeting point learning control part 12c sets a capacity confirmation flag CAPAFLG (CAPAFLG=1), and proceeds to Step S11.

Figure 5:
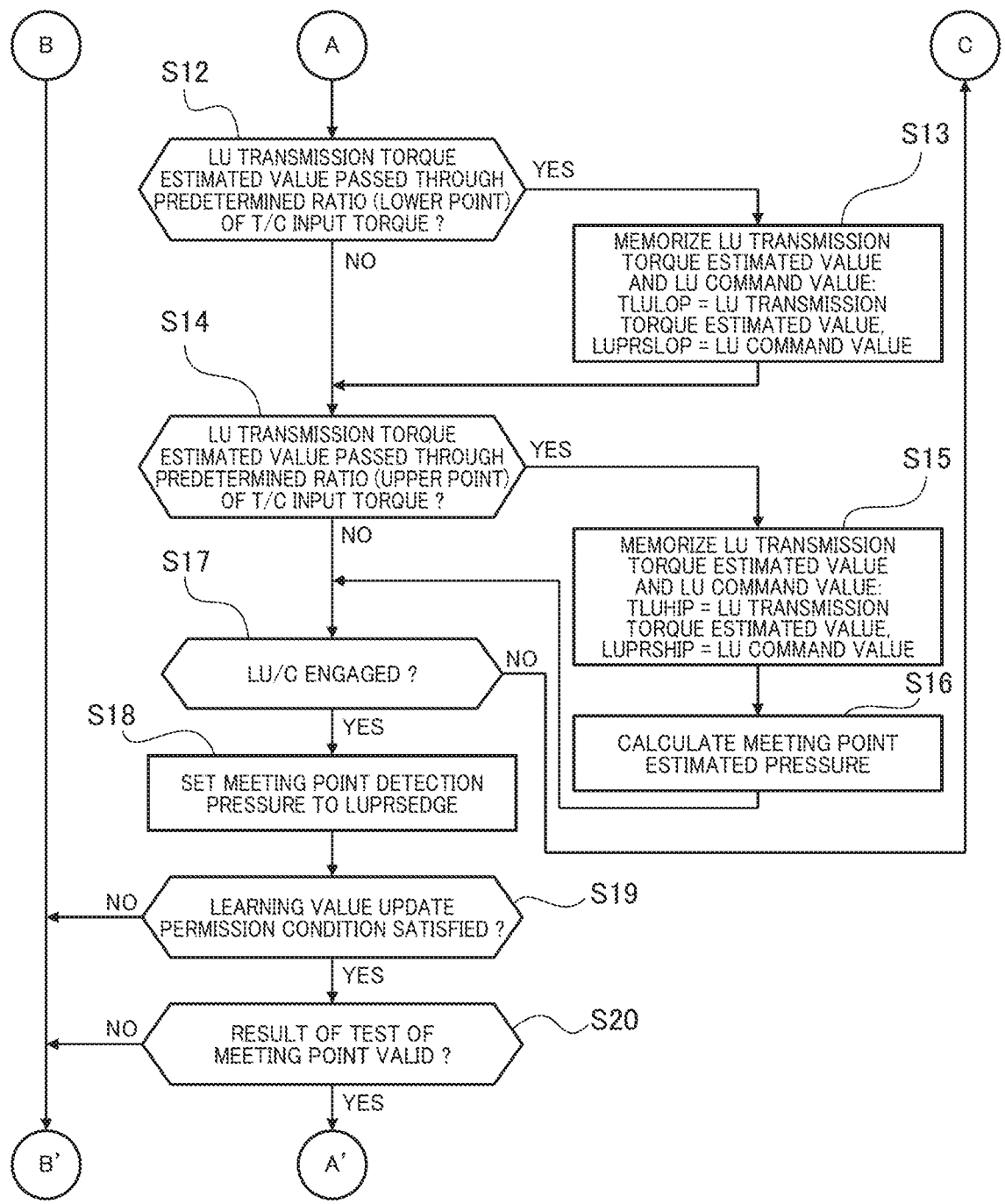
FIG. 5 is a flow chart 2 showing a flow of process of meeting point learning control performed by the meeting point learning control part of the CVT control unit according to the first embodiment.
Figure 6:
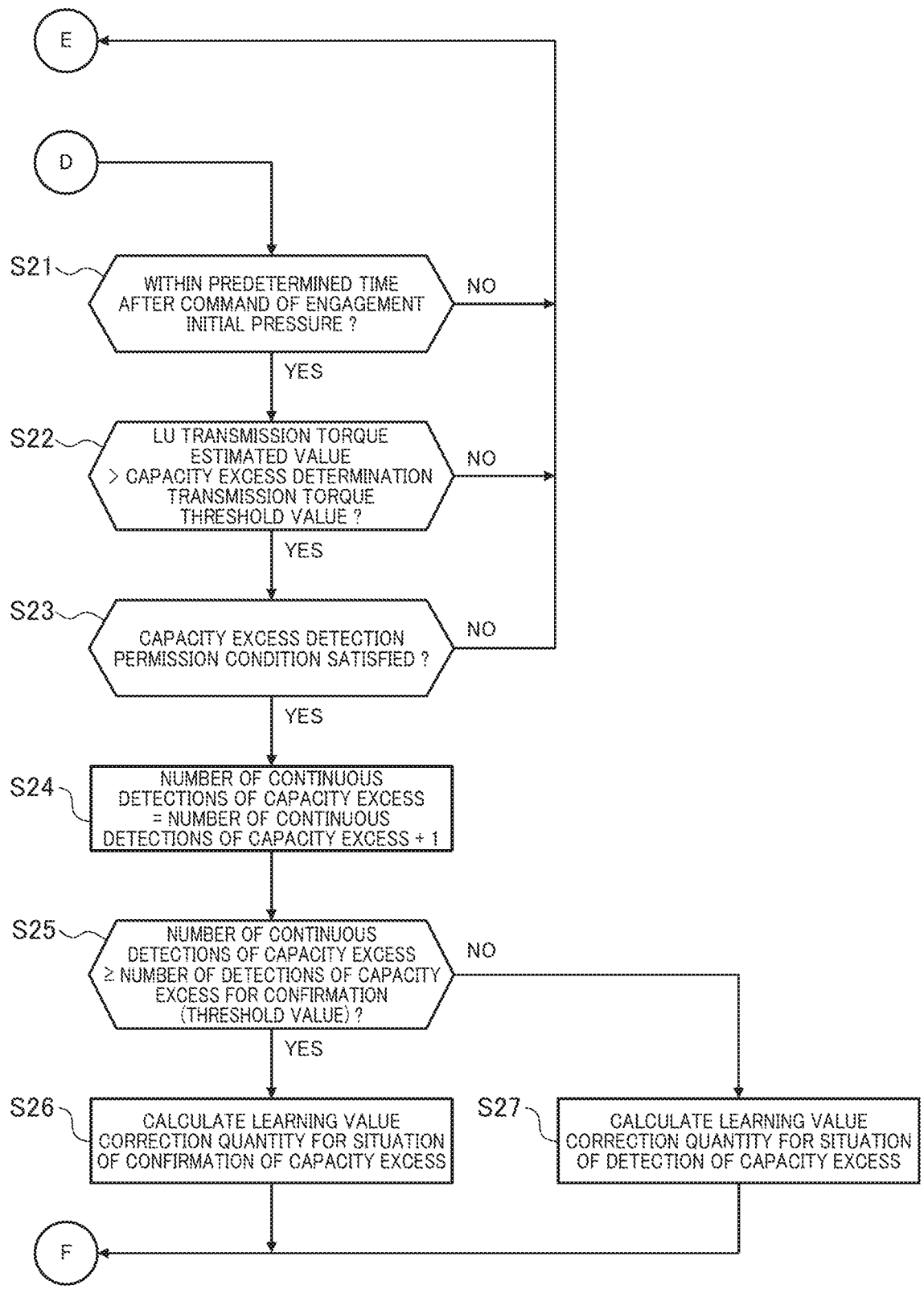
FIG. 6 is a flow chart 3 showing a flow of process of meeting point learning control performed by the meeting point learning control part of the CVT control unit according to the first embodiment.

At Step S11, following the determination at Step S9 that the LU transmission torque estimated value≤the calculation variation of the LU transmission torque estimated value, or the setting of capacity confirmation flag CAPAFLG at Step S10, or the determination of NO at Step S21, S22, or S23 in the flow of capacity excess detection in FIG. 6, the meeting point learning control part 12c determines whether or not capacity confirmation flag CAPAFLG is equal to 1. In case of YES (CAPAFLG=1), meeting point learning control part 12c proceeds to Step S12 in FIG. 5, and Step S21 in the flow of capacity excess detection in FIG. 6. In case of NO (CAPAFLG=0), meeting point learning control part 12c returns to Step S1. The process of Step S12 onward and the flow of capacity excess detection in FIG. 6 are performed in parallel.

At Step S12, following the determination at Step S11 that CAPAFLG=1, the meeting point learning control part 12c determines whether or not the LU transmission torque estimated value passes through a predetermined ratio (lower point) of a T/C input torque. In case of YES (the lower point is passed through), meeting point learning control part 12c proceeds to Step S13. In case of NO (the lower point is not passed through), meeting point learning control part 12c proceeds to Step S14. The predetermined ratio of the lower point with respect to T/C input torque is higher than a ratio with which CAPAFLG=1 is determined, and lower than that of an upper point described below. The lower point is a point of the LU transmission torque estimated value apart by a predetermined ratio change from the upper point. Both of the upper point and the lower point are less than or equal to 50% of T/C input torque.

At Step S13, following the determination at Step S12 that the lower point is passed through, the meeting point learning control part 12c memorizes an LU transmission torque estimated value TLULOP and an LU command value LUPRSLOP when the lower point is passed through, and proceeds to Step S14.

At Step S14, following the determination at Step S12 that the lower point is not passed through, or the memorization of the LU transmission torque estimated value TLULOP and the LU command value LUPRSLOP at Step S13, the meeting point learning control part 12c determines whether or not the LU transmission torque estimated value passes through a predetermined ratio (upper point) of the T/C input torque. In case of YES (the upper point is passed through), meeting point learning control part 12c proceeds to Step S15. In case of NO (the upper point is not passed through), meeting point learning control part 12c proceeds to Step S17. The predetermined ratio of the upper point with respect to T/C input torque is higher than that of the lower point. The upper point is a point of the LU transmission torque estimated value apart by the predetermined ratio change from the lower point, and is less than or equal to 50% of T/C input torque.

At Step S15, following the determination at Step S14 that the upper point is passed through, the meeting point learning control part 12c memorizes an LU transmission torque estimated value TLUHIP and an LU command value LUPRSHIP when the upper point is passed through, and proceeds to Step S16.

At Step S16, following the memorization of the LU transmission torque estimated value TLUHIP and the LU command value LUPRSHIP at Step S15, the meeting point learning control part 12c calculates a meeting point estimated pressure, and proceeds to Step S17. The meeting point estimated pressure LUPRSEDGE #, which is an LU command value at the meeting point, is estimated and calculated from the LU transmission torque estimated value TLULOP and the LU command value LUPRSLOP at the lower point and the LU transmission torque estimated value TLUHIP and the LU command value LUPRSHIP at the upper point by using an equation of LUPRSEDGE #=LUPRSLOP−(LUPRSHIP−LUPRSLOP)/(TLUHIP−TLULOP)*(TLULOP−TLUEDGE). This equation calculates an LU command value at a point of a line passing through the lower point and the upper point, where the LU transmission torque estimated value TLULOP starts to increase.

At Step S17, following the determination at Step S14 that the upper point is not passed through, or the calculation of the meeting point estimated pressure at Step S16, the meeting point learning control part 12c determines whether or not the lockup clutch LU/C is engaged. In case of YES (LU/C is engaged), meeting point learning control part 12c proceeds to Step S18. In case of NO (LU/C is not engaged), meeting point learning control part 12c returns to Step S1. The phrase "LU/C is engaged" means that engagement of the lockup clutch LU/C is completed. This determination is affirmed in response to a situation that the LU transmission torque estimated value has reached a predetermined ratio for engagement determination (80% or higher, for example) of the T/C input torque.

At Step S18, following the determination at Step S17 that the LU/C is engaged, the meeting point learning control part 12c sets a meeting point detection pressure to the LU command value LUPRSEDGE memorized at Step S6, and proceeds to Step S19. The meeting point detection pressure is a value of the LU command value corresponding to a detected pressure at the meeting point, which is provisionally set by the present operation.

At Step S19, following the provisional setting of the meeting point detection pressure at Step S18, the meeting point learning control part 12c determines whether or not a learning value update permission condition is satisfied. In case of YES (the learning value update permission condition is satisfied), meeting point learning control part 12c proceeds to Step S20. In case of NO (the learning value update permission condition is unsatisfied), meeting point learning control part 12c proceeds to Step S40 in the flow of learning value update in FIG. 7. The learning value update permission condition is determined as being satisfied when all of the following requirements are met:

[predetermined lower limit value]<[oil temperature]<[predetermined upper limit value] (oil temperature requirement),

[predetermined lower limit value]<[throttle opening]<[predetermined upper limit value] (throttle opening requirement),

[engine torque change band]<[torque change threshold value] (engine torque stability requirement),

[throttle opening change band]<[opening change threshold value] (throttle opening stability requirement), and

[predetermined value]<[engine rotational speed] (requirement for determination of balance of oil quantity).

At Step S20, following the determination at Step S19 that the learning value update permission condition is satisfied, the meeting point learning control part 12c determines whether or not a result of testing of the meeting point is valid. In case of YES (the result of testing of the meeting point is valid), meeting point learning control part 12c proceeds to Step S28 in the flow of learning value update in FIG. 7. In case of NO (the result of testing of the meeting point is invalid), meeting point learning control part 12c proceeds to Step S40 in the flow of learning value update in FIG. 7. The testing of the meeting point is implemented by checking an equation of [predetermined lower limit value] <|[meeting point estimated pressure]−[meeting point detection pressure]|<[predetermined upper limit value]. When the absolute value of the detection error between the meeting point estimated pressure and the meeting point detection pressure is within the range from the predetermined lower limit value to the predetermined upper limit value, it is determined that the result of testing of the meeting point is valid.

At Step S21, following the determination at Step S11 that CAPAFLG=1, the meeting point learning control part 12c determines whether or not it is within a predetermined time period after commanding of engagement initial pressure. In case of YES (it is within the predetermined time period after commanding of engagement initial pressure), meeting point learning control part 12c proceeds to Step S22. In case of NO (it is beyond the predetermined time period after commanding of engagement initial pressure), meeting point learning control part 12c returns to Step S11.

At Step S22, following the determination at Step S21 that it is within the predetermined time period after commanding of engagement initial pressure, the meeting point learning control part 12c determines whether or not the LU transmission torque estimated value calculated by the equation (1) exceeds a capacity excess determination transmission torque threshold value. In case of YES (the LU transmission torque estimated value>the capacity excess determination transmission torque threshold value), meeting point learning control part 12c proceeds to Step S23. In case of NO (the LU transmission torque estimated value≤the capacity excess determination transmission torque threshold value), meeting point learning control part 12c returns to Step S11.

At Step S23, following the determination at Step S22 that the LU transmission torque estimated value>the capacity excess determination transmission torque threshold value, the meeting point learning control part 12c determines whether or not a capacity excess detection permission condition is satisfied. In case of YES (the capacity excess detection permission condition is satisfied), meeting point learning control part 12c proceeds to Step S24. In case of NO (the capacity excess detection permission condition is unsatisfied), meeting point learning control part 12c returns to Step S11. The capacity excess detection permission condition is based on monitoring of changes of engine torque and throttle opening, and is determined as being satisfied when it is determined that the engine torque is stable and the throttle opening is stable.

At Step S24, following the determination at Step S23 that the capacity excess detection permission condition is satisfied, the meeting point learning control part 12c calculates a present number of capacity excess continuous detections by adding 1 to the last number of capacity excess continuous detections, and proceeds to Step S25.

At Step S25, following the calculation of the number of capacity excess continuous detections at Step S24, the meeting point learning control part 12c determines whether or not the number of capacity excess continuous detections is greater than or equal to a threshold value. In case of YES (the number of capacity excess continuous detections≥the threshold value), meeting point learning control part 12c proceeds to Step S26. In case of NO (the number of capacity excess continuous detections<the threshold value), meeting point learning control part 12c proceeds to Step S27. The threshold value for the number of capacity excess continuous detections is set to two or three.

Figure 7:
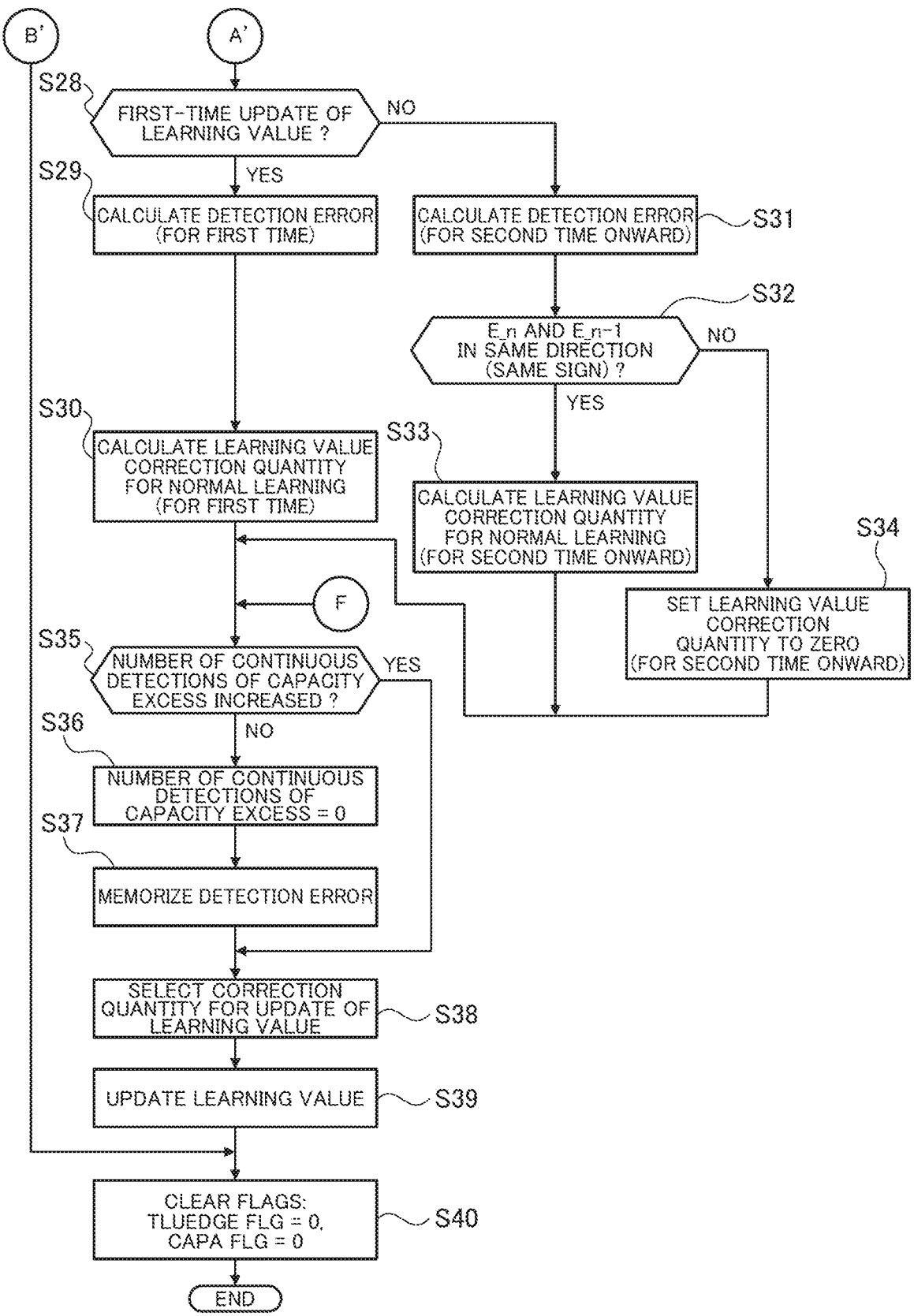
FIG. 7 is a flow chart 4 showing a flow of process of meeting point learning control performed by the meeting point learning control part of the CVT control unit according to the first embodiment.

At Step S26, following the determination at Step S25 that the number of capacity excess continuous detections≥the threshold value, the meeting point learning control part 12c calculates a learning value correction quantity for state of confirmation of capacity excess, and proceeds to Step S35 in the flow of learning value update in FIG. 7. The learning value correction quantity for state of confirmation of capacity excess is a quantity of correction of the learning value for reducing the learning value to reliably prevent capacity excess, and is set to a value that is several times (five times, for example) the maximum value of the learning value correction quantity for normal state, based on confirmation of capacity excess.

At Step S27, following the determination at Step S25 that the number of capacity excess continuous detections<the threshold value, the meeting point learning control part 12c calculates the learning value correction quantity for state of detection of capacity excess, and proceeds to Step S35 in the flow of learning value update in FIG. 7. The learning value correction quantity for state of detection of capacity excess is a quantity of correction of the learning value for reducing the learning value to prevent capacity excess, and is set to about the maximum value of the learning value correction quantity for normal state, based on detection of capacity excess.

At Step S28, following the determination at Step S20 that the result of testing of the meeting point is valid, the meeting point learning control part 12c determines whether or not updating of the learning value of the meeting point is for the first time. In case of YES (first-time update of the learning value), meeting point learning control part 12c proceeds to Step S29. In case of NO (two or more updates of the learning value), meeting point learning control part 12c proceeds to Step S31.

At Step S29, following the determination at Step S28 that updating of the learning value of the meeting point is for the first time, the meeting point learning control part 12c calculates an initial detection error $E\_1$, and proceeds to Step S30. The initial detection error $E\_1$ is calculated by an equation of [initial detection error $E\_1$]=[learning initial value $L\_0$]−[learning detected value $M\_1$ (meeting point)].

Figure 10:
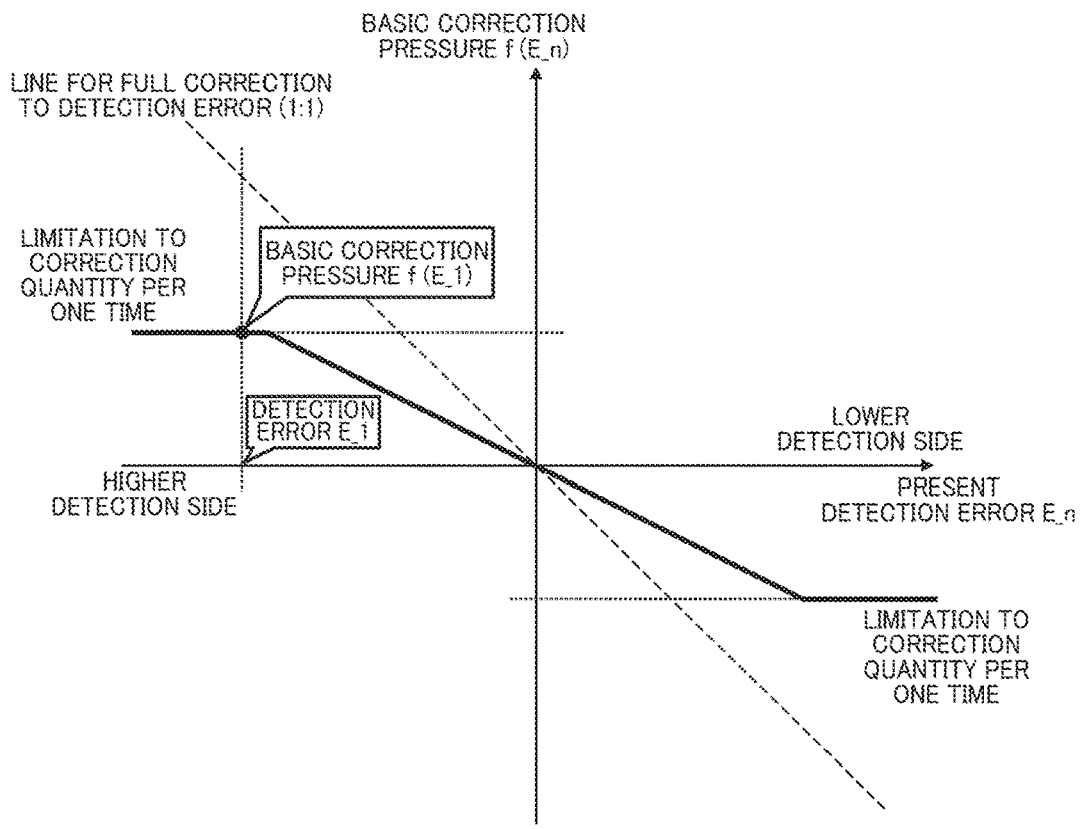
FIG. 10 is a basic correction pressure map showing characteristics of relationship between a basic correction pressure and an initial detection error, which is employed in initial calculation of a learning value, according to the first embodiment.

At Step S30, following the calculation of initial detection error $E\_1$ at Step S29, the meeting point learning control part 12c calculates a learning value correction quantity for normal state of learning (for the first time), and proceeds to Step S35. As shown in FIG. 10, the learning value correction quantity for normal state of learning (for the first time) is set to a basic correction pressure $f(E\_1)$ with respect to initial detection error $E\_1$, wherein basic correction pressure $f(E\_1)$ is equal to about ±10 kPa, for example.

At Step S31, following the determination at Step S28 that the number of updates of the learning value is two or more, the meeting point learning control part 12c calculates a detection error $E\_n$ for the n-th time, and proceeds to Step S32. The detection error $E\_n$ is calculated by an equation of [detection error $E\_n$]=[last learning value $L(n-1)$]−[learning detected value $M\_n$ (meeting point)].

At Step S32, following the calculation of detection error $E\_n$ for the n-th time at Step S31, the meeting point learning control part 12c determines whether or not the present detection error $E\_n$ and the last detection error $E\_n-1$ are in the same direction (the same sign). In case of YES ($E\_n$ and $E\_n-1$ have the same sign), meeting point learning control part 12c proceeds to Step S33. In case of NO ($E\_n$ and $E\_n-1$ have different signs), meeting point learning control part 12c proceeds to Step S34.

Figure 12:
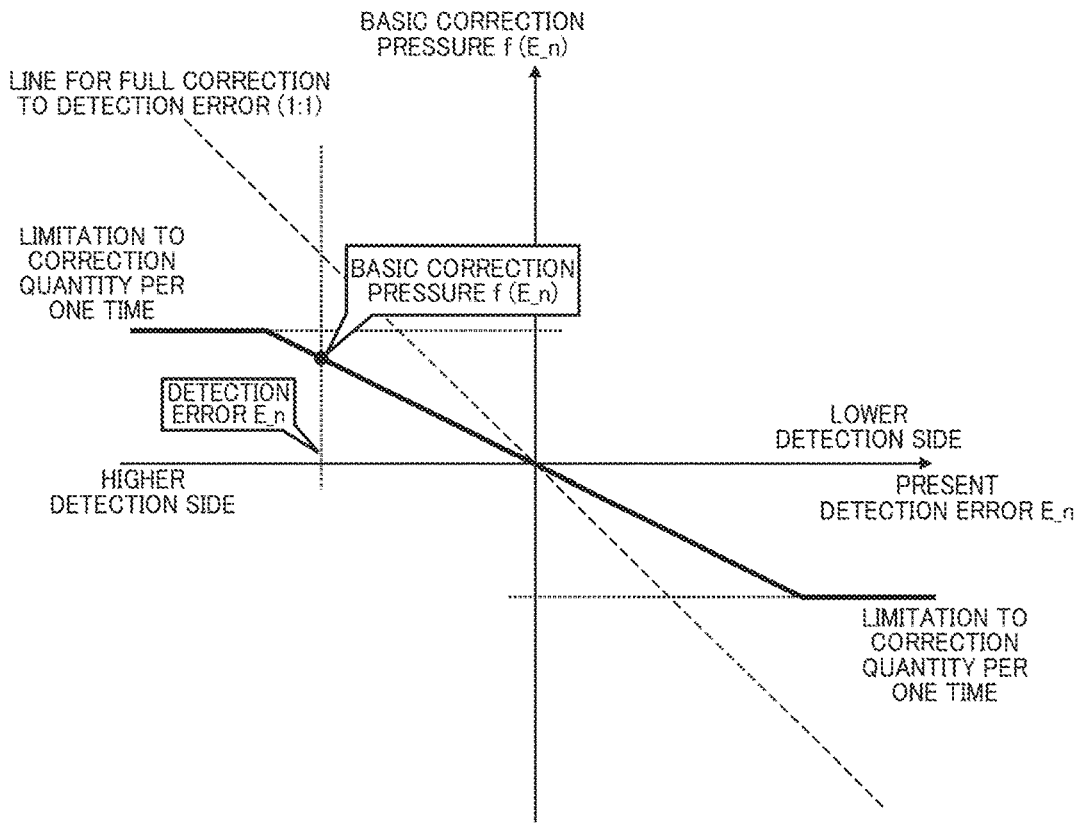
FIG. 12 is a basic correction pressure map showing characteristics of relationship between the basic correction pressure and a present detection error (for the n-th time), which is employed in present calculation (for the n-th time) of the learning value, according to the first embodiment.
Figure 13:
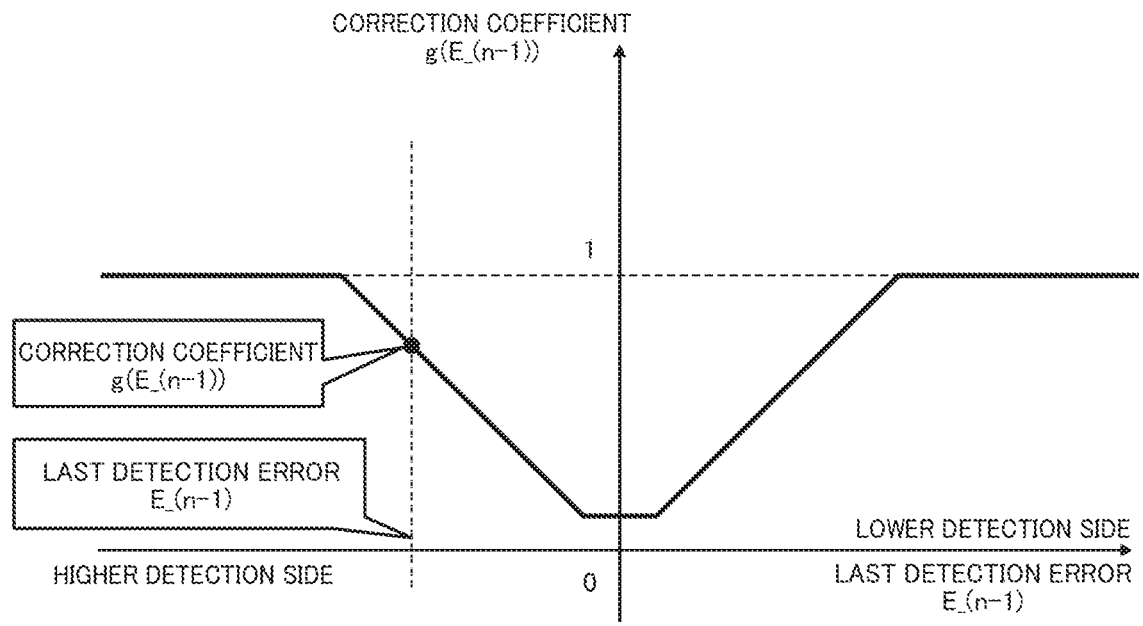
FIG. 13 is a correction coefficient map showing characteristics of relationship between a correction coefficient and a last detection value (for the (n−1)th time), which is employed in present calculation (for the n-th time) of the learning value, according to the first embodiment.

At Step S33, following the determination at Step S32 that $E\_n$ and $E\_n-1$ have the same sign, the meeting point learning control part 12c calculates the learning value correction quantity for normal state of learning (for the second time onward), and proceeds to Step S35. The learning value correction quantity for normal state of learning (for the second time onward) is calculated by determining the basic correction pressure $f(E\_n)$ based on the present detection error $E\_n$ as shown in FIG. 12, and determining a correction efficient $g(E\_(n-1))$ based on the last detection error $E\_n-1$ as shown in FIG. 13, and calculating an equation of [learning value correction quantity (for the second time onward)]=$f(E\_n) \cdot g(E\_(n-1))$.

At Step S34, following the determination at Step S32 that $E\_n$ and $E\_n-1$ have different signs, the meeting point learning control part 12c sets the learning value correction quantity (for the second time onward) to zero, and proceeds to Step S35.

At Step S35, following the calculation of the learning value correction quantity at Step S26 or S27, or the calculation of the learning value correction quantity at Step S30 or S33 or S34, the meeting point learning control part 12c determines whether or not the number of capacity excess continuous detections has increased. In case of YES (the number of capacity excess continuous detections has increased), meeting point learning control part 12c proceeds to Step S38. In case of NO (the number of capacity excess continuous detections is unchanged), meeting point learning control part 12c proceeds to Step S36.

At Step S36, following the determination at Step S35 that the number of capacity excess continuous detections is unchanged, the meeting point learning control part 12c resets the number of capacity excess continuous detections to zero, and proceeds to Step S37.

At Step S37, following the setting of the number of capacity excess continuous detections=0, the meeting point learning control part 12c memorizes the present detection error E_n in the last detection error E_n−1, and proceeds to Step S38.

At Step S38, following the memorization of the detection error at Step S37, or the determination at Step S35 that the number of capacity excess continuous detections has increased, the meeting point learning control part 12c selects a correction quantity of the learning value of the meeting point for updating, and proceeds to Step S39. The selection of correction quantity of the learning value of the meeting point for updating is implemented by selecting the correction quantity of the learning value for state of detection (confirmation) of capacity excess, when both of the determination of normal learning and the determination of detection (confirmation) of capacity excess are made simultaneously.

At Step S39, following the selection of the correction quantity of the learning value of the meeting point for updating at Step S38, the meeting point learning control part 12c updates the learning value of the meeting point, and proceeds to Step S40. The updating of the learning value of the meeting point is implemented by replacing the memorized previously learning value of the meeting point with a new learning value Ln of the meeting point that is obtained by adding the learning value correction quantity to the last learning value L_n−1.

At Step S40, following the determination at Step S7 that the LU transmission torque estimated value change quantity≤the monotonous increase determination threshold value, or the determination at Step S19 that the learning value update permission condition is unsatisfied, or the determination at Step S20 that the result of testing of the meeting point is invalid, or the updating of the learning value at Step S39, the meeting point learning control part 12c dears the flags, and proceeds to the end. The flags to be cleared are the monotonous increase determination flag TLUEDGEFLAG and the capacity confirmation flag CAPAFLG. When TLUEDGEFLAG=1, TLUEDGEFLAG is cleared to zero; when CAPAFLG=1, CAPAFLG is cleared to zero.

The following describes actions of the lockup clutch control device and lockup clutch control method applied to the engine vehicle according to the first embodiment, separately in sections "Actions of Meeting Point Learning Control Process", "Actions of Meeting Point Detection", "Learning Value Update by Normal Learning Determination", "Learning Value Update by Capacity Excess Detection (Confirmation) Determination", and "Characteristic Actions of Meeting Point Learning Control".

[Actions of Meeting Point Learning Control Process]

Figure 4:
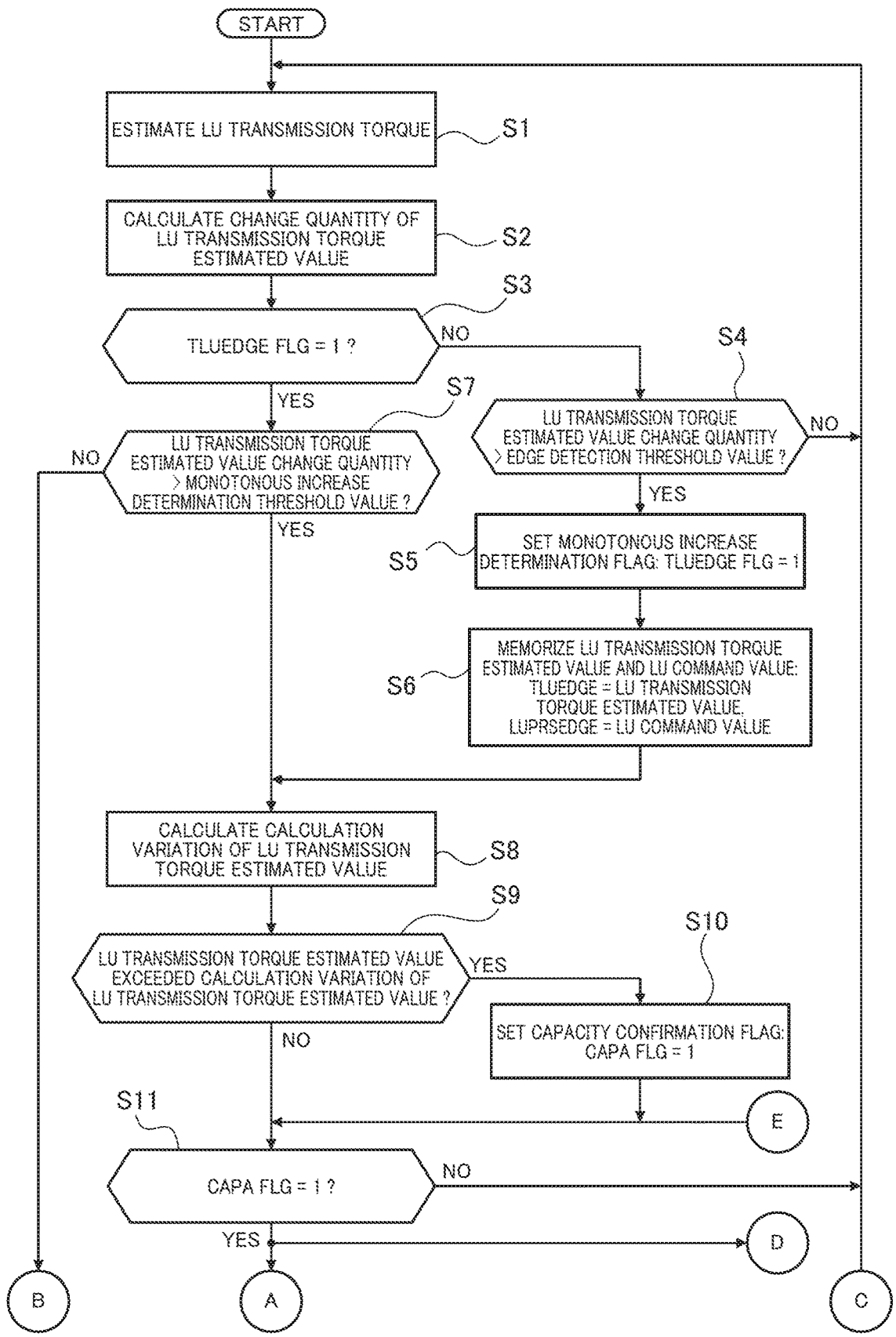
FIG. 4 is a flow chart 1 showing a flow of process of meeting point learning control performed by a meeting point learning control part of the CVT control unit according to the first embodiment.

The following describes actions of the meeting point learning control process according to the first embodiment, separately in sections "Actions of Process of Meeting Point Detection: FIGS. 4 and 5", "Actions of Process of Capacity Excess Detection Determination: FIG. 6", and "Actions of Process of Normal Learning Determination: FIG. 7".

(Actions of Process of Meeting Point Detection: FIGS. 4 and 5)

Immediately after the vehicle starts from a standstill, vehicle speed VSP increases, and an LU engagement request is outputted, the monotonous increase determination flag TLUEDGEFLAG is equal to zero, and the LU transmission torque estimated value change quantity≤edge detection threshold value. Accordingly, in the flow chart shown in FIG. 4, the flow of Step S1→Step S2→Step S3→Step S4 is repeated. During the repetition, the LU transmission torque is estimated at Step S1, and the LU transmission torque estimated value change quantity is calculated at Step S2.

When the LU transmission torque estimated value change quantity thereafter starts to rise and it is determined at Step S4 that the LU transmission torque estimated value change quantity>the edge detection threshold value, the process proceeds as Step S4→Step S5→Step S6→Step S8→Step S9→Step S11. At Step S5, the monotonous increase determination flag TLUEDGEFLAG is set to 1, and at Step S6, it memorizes the LU transmission torque estimated value TLUEDGE and the LU command value LUPRSEDGE when it is determined that the LU transmission torque estimated value change quantity>the edge detection threshold value.

With TLUEDGEFLAG set to 1 at Step S5, during the next control execution, the control process proceeds from Step S11 to Step S1→Step S2→Step S3→Step S7. At Step S7, it is determined whether or not the LU transmission torque estimated value change quantity>the monotonous increase determination threshold value, and when the LU transmission torque estimated value change quantity>the monotonous increase determination threshold value, the process proceeds to Step S8, and the meeting point learning process continues. When the LU transmission torque estimated value change quantity≤the monotonous increase determination threshold value, the process proceeds as Step S23→the end, wherein the meeting point learning process is terminated because the situation is not one where the LU transmission torque estimated value change quantity increases monotonously (the situation is unsuitable for learning using characteristics of monotonous increase of the LU transmission torque estimated value).

While it is determined at Step S7 that the LU transmission torque estimated value change quantity>the monotonous increase determination threshold value, the process proceeds from Step S7 to Step S8→Step S9. At Step S8, the variation of calculation of LU transmission torque estimated value is calculated. At Step S9, it is determined whether or not the LU transmission torque estimated value has exceeded the variation of calculation of LU transmission torque estimated value. When the state of (the LU transmission torque estimated value≤the variation of calculation of LU transmission torque estimated value) shifts to the state of (the LU transmission torque estimated value>the variation of calculation of LU transmission torque estimated value) at Step S9, the process proceeds to Step S10. Namely, when it is confirmed at Step S9 that the clutch meeting point (point of occurrence of LU capacity) is detected within the variation of calculation of LU transmission torque estimated value, the capacity flag CAPAFLG is set to 1 at Step S10. Subsequently, at Step S11, it is determined whether or not the capacity flag CAPAFLG is equal to 1. In case of CAPAFLG=1, the process proceeds from Step S11 to Step S12 in FIG. 5.

At Step S12, it is determined whether or not the LU transmission torque estimated value passes through the predetermined ratio (lower point) of the T/C input torque. When the lower point is passed through, the process proceeds to Step S13 where it memorizes the LU transmission torque estimated value TLULOP and the LU command value LUPRSLOP when the lower point is passed through. After the lower point is passed through, at Step S14, it is determined whether or not the LU transmission torque estimated value passes through the predetermined ratio (upper point) of the T/C input torque. When the upper point is passed through, the process proceeds to Step S15 where it memorizes the LU transmission torque estimated value TLUHIP and the LU command value LUPRSHIP when the upper point is passed through. At Step S16, the meeting point estimated pressure LUPRSEDGE # is calculated which is an LU command value at the point where the LU transmission torque estimated value starts to rise on the line passing through the lower point and the upper point. The process thereafter proceeds to Step S17 where it is determined whether or not the lockup clutch LU/C is engaged. When engagement of the lockup clutch LU/C is completed, the process proceeds to Step S18 onward. When engagement of lockup clutch LU/C is not completed, the process returns to Step S1. The calculation of the LU transmission torque estimated value at Step S1 and the calculation of the LU transmission torque estimated value change quantity at Step S2 are repeated until it is determined that engagement of lockup clutch LU/C is completed.

When it is determined at Step S17 that engagement of lockup clutch LU/C is completed, the process proceeds to Step S18 where the meeting point detection pressure is set to the LU command value LUPRSEDGE memorized at Step S6. Subsequently, at Step S19, it is determined whether or not the learning value update permission condition is satisfied. When it is determined at Step S19 that the learning value update permission condition is unsatisfied, the process proceeds as Step S40→the end, wherein the meeting point learning process is terminated because it is likely to cause erroneous learning of the meeting point learning value. When it is determined at Step S19 that the learning value update permission condition is satisfied, the process proceeds to Step S20 where it is determined whether or not the result of testing of the meeting point is valid. When it is determined that the result of testing of the meeting point is invalid, the process proceeds as Step S40→the end, wherein the meeting point learning process is terminated because it is likely to cause erroneous learning of the meeting point learning value.

(Actions of Process of Capacity Excess Detection Determination: FIG. 6)

When CAPAFLG=1 is determined at Step S11, the process proceeds from Step S11 to Step S12 onward in FIG. 5 and from Step S11 to Step S21 onward in FIG. 6, where the process of meeting point detection and the process of capacity excess detection determination are performed in parallel.

During the process of capacity excess detection determination, it checks the condition about time period after commanding of engagement initial pressure at Step S21, and the condition about torque that the LU transmission torque estimated value>the capacity excess determination transmission torque threshold value at Step S22, and whether the capacity excess detection permission condition is satisfied at Step S23.

When it is determined that one of the three conditions is unsatisfied, it repeats the loop process where the number of capacity excess detections is not counted. When it is determined that all of the three conditions are satisfied, the process proceeds to Step S24 where the number of capacity excess detections is counted, and if the number of capacity excess detections is already counted, the number of capacity excess detections is incremented by 1 as the number of capacity excess continuous detections. Subsequently, at Step S25, it is determined whether or not the number of capacity excess continuous detections is greater than or equal to the threshold value (two or three). When the number of capacity excess continuous detections<the threshold value, the process proceeds to Step S27 where the learning value correction quantity for state of detection of capacity excess is calculated. The learning value correction quantity for state of detection of capacity excess is a quantity of correction of the learning value for reducing the learning value to prevent capacity excess, and is set to about the maximum value of the learning value correction quantity for normal state.

On the other hand, when it is determined at Step S25 whether or not the number of capacity excess continuous detections is greater than or equal to the threshold value, and that the number of capacity excess continuous detections≥the threshold value, the process proceeds to Step S26 where the learning value correction quantity for state of confirmation of capacity excess is calculated. The learning value correction quantity for state of confirmation of capacity excess is a quantity of correction of the learning value for reducing the learning value to reliably prevent capacity excess, and is set to a value that is several times (five times, for example) the maximum value of the learning value correction quantity for normal state.

After the learning value correction quantity for state of detection (confirmation) of capacity excess is calculated, the process proceeds as Step S35→Step S38 in the flow of learning value update in FIG. 7. At Step S38, the learning value correction quantity for state of detection (confirmation) of capacity excess is selected as the correction quantity for updating, prior to the learning value correction quantity for normal state of learning. The process then proceeds to Step S39 where the learning value is updated.

(Actions of Process of Normal Learning Determination: FIG. 7)

When it is determined at Step S19 that the learning value update permission condition is satisfied and it is determined at Step S20 that the result of testing of the meeting point is valid, the meeting point is set to the learning detection value. The process then proceeds from Step S20 to Step S28 onward in FIG. 7 where the process of normal learning determination is performed.

Specifically, at Step S28, it is determined whether or not updating of the learning value of the meeting point is for the first time. In case of the first update of the learning value, the process proceeds from Step S28 to Step S29→Step S30→Step S35→Step S36→Step S37→Step S38→Step S39. At Step S29, the initial detection error E_1 is calculated, and at Step S30, the learning value correction quantity for normal state of learning (for the first time) is calculated. Since the number of capacity excess continuous detections is equal to zero, the process proceeds to Step S37 where the present detection error E_n is memorized in the last detection error E_n−1. Subsequently, at Step S38, the learning value correction quantity for normal state of learning (for the first time) calculated at Step S30 is selected as a correction quantity of the learning value of the meeting point for updating. Then, at Step S39, the learning value of the meeting point is updated by addition of the learning value correction quantity for normal state of learning (for the first time).

When it is determined at Step S28 that two or more updates of the learning value have been made, and it is determined that the present detection error E_n and the last detection error E_n−1 are in the same direction, the process proceeds from Step S28 to Step S31→Step S32→Step S33→Step S35→Step S36→Step S37→Step S38→Step S39. Following the calculation of the n-th detection error E_n at Step S31 and the determination at Step S32 that E_n and E_n−1 are in the same direction, the learning value correction quantity for normal state of learning (for the second time onward) is calculated at Step S33. Since the number of capacity excess continuous detections is equal to zero, the process proceeds to Step S37 where the present detection error E_n is memorized in the last detection error E_n−1. Subsequently, at Step S38, the learning value correction quantity for normal state of learning (for the second time onward) calculated at Step S33 is selected as a correction quantity of the learning value of the meeting point for updating. Then, at Step S39, the learning value of the meeting point is updated by addition of the learning value correction quantity for normal state of learning (for the second time onward).

Furthermore, when it is determined at Step S28 that two or more updates of the learning value have been made, and it is determined that the present detection error E_n and the last detection error E_n−1 are in different directions, the process proceeds from Step S28 to Step S31→Step S32→Step S34→Step S35→Step S36→Step S37→Step S38→Step S39. Following the calculation of the n-th detection error E_n at Step S31 and the determination at Step S32 that E_n and E_n−1 are in different directions, the learning value correction quantity for normal state of learning (for the second time onward) is set to zero (indicating "no correction") at Step S34. Since the number of capacity excess continuous detections is equal to zero, the process proceeds to Step S37 where the present detection error E_n is memorized in the last detection error E_n−1. Subsequently, at Step S38, the value of zero obtained at Step S34 is selected as a correction quantity of the learning value of the meeting point for updating. Then, at Step S39, the learning value of the meeting point is maintained unchanged from the last learning value.

[Actions of Meeting Point Detection]

Figure 8:
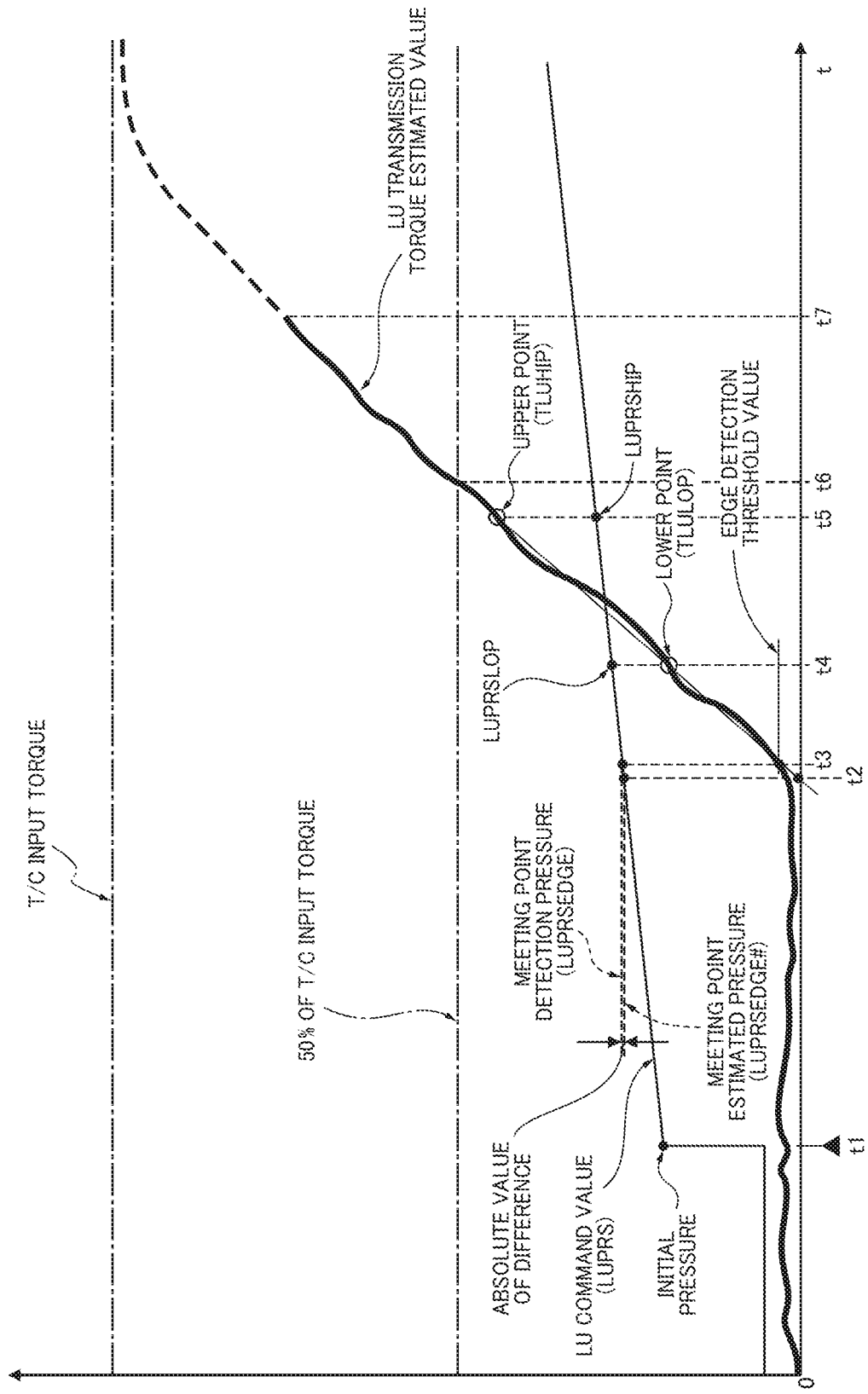
FIG. 8 is a time chart showing characteristics of an LU command value and an LU transmission torque estimated value, for illustrating actions of meeting point detection according to the first embodiment when a lockup clutch shifts from disengaged state into engaged state during the vehicle is running.

The following describes actions of the meeting point detection according to the first embodiment with reference to a time chart shown in FIG. 8. In FIG. 8, a time instant t1 is a time instant at which an LU engagement request is outputted. A time instant t2 is a time instant at which the meeting point estimated pressure is calculated. A time instant t3 is a time instant at which the meeting point detection pressure is determined. A time instant t4 is a time instant at which the lower point is passed through. A time instant t5 is a time instant at which the upper point is passed through. A time instant t6 is a time instant at which 50% of the T/C input torque is passed through. A time instant t7 is a time instant at which it is determined that engagement of lockup clutch 3 is completed. The following describes actions of the meeting point detection about the LU transmission torque estimated value in an example situation where the LU command value is increased linearly from time instant t1 (the LU command value=the initial pressure) when the LU engagement request is outputted, and lockup clutch 3 is engaged.

After time instant t1 when the LU engagement request is issued, the LU transmission torque estimated value and the LU transmission torque estimated value change quantity are calculated. When the LU transmission torque estimated value change quantity exceeds the edge detection threshold value at time instant t3, the LU command value at time instant t3 is memorized. At time instant t3, meeting point detection pressure LUPRSEDGE is set to the memorized LU command value.

When the lower point is passed through at time instant t4, the LU transmission torque estimated value TLULOP and the LU command value LUPRSLOP at that time instant are memorized. Furthermore, when the upper point is passed through at time instant t5, the LU transmission torque estimated value TLUHIP and the LU command value LUPRSHIP at that time instant are memorized. When the LU transmission torque estimated value TLUHIP and the LU command value LUPRSHIP at that time instant are memorized at time instant t5, the meeting point estimated pressure LUPRSEDGE # is calculated based on the acquired information at the lower point, the acquired information at the upper point, and the LU command value LUPRSEDGE. Namely, as shown in FIG. 8, the meeting point estimated pressure LUPRSEDGE # is calculated which is an LU command value at the point (time instant t2) at which an extension line passing through the lower point and the upper point crosses a coordinate axis indicating that the LU transmission torque estimated value is equal to zero, wherein at the meeting point estimated pressure LUPRSEDGE #, lockup clutch 3 is assumed to shift into a state to transmit the torque.

When the meeting point estimated pressure LUPRSEDGE # is calculated and it is determined that the capacity excess detection permission condition is satisfied, it is determined whether or not the result of testing of the meeting point detection pressure LUPRSEDGE is valid. Namely, as shown in FIG. 8, when the absolute value of the difference between the meeting point detection pressure LUPRSEDGE and the meeting point estimated pressure LUPRSEDGE # is within the range from the predetermined lower limit value to the predetermined upper limit value, it is determined that the result of testing of the meeting point is valid. When it is determined that the result of testing of the meeting point is valid, the currently acquired meeting point detection pressure LUPRSEDGE is employed in the update process of the learning value, and the meeting point learning value is updated from the last memorized value. When it is determined that the result of testing of the meeting point is invalid, the currently acquired meeting point detection pressure LUPRSEDGE is abandoned and no update of the learning value is performed.

[Learning Value Update by Normal Learning Determination]

Figure 9:
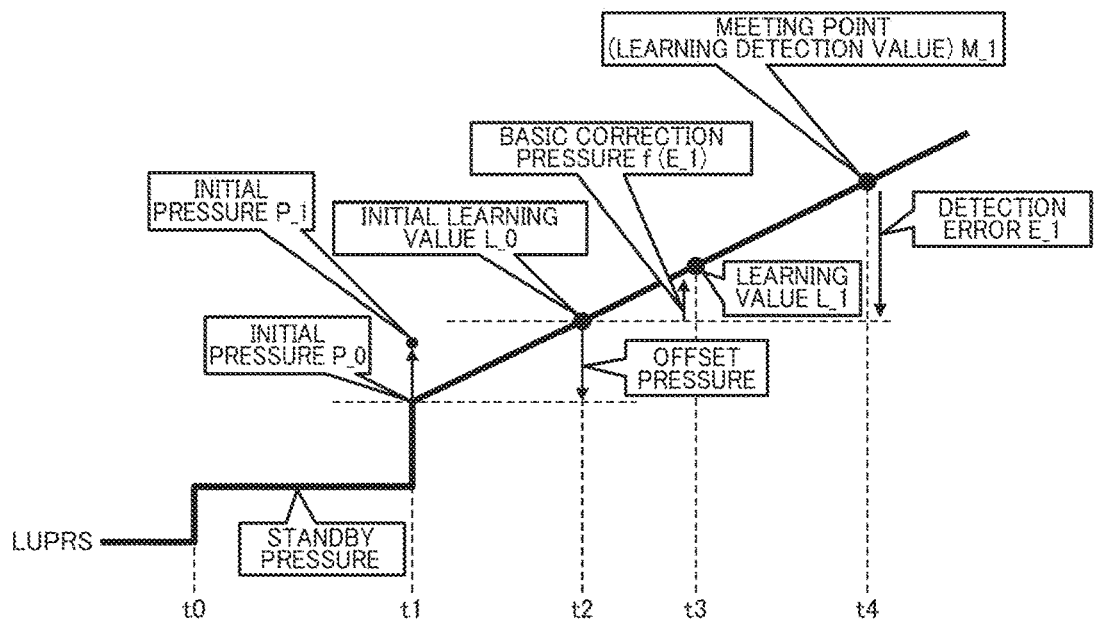
FIG. 9 is a time chart showing actions of learning detection for the first time when the lockup clutch shifts from disengaged state into engaged state while the vehicle is running.
Figure 11:
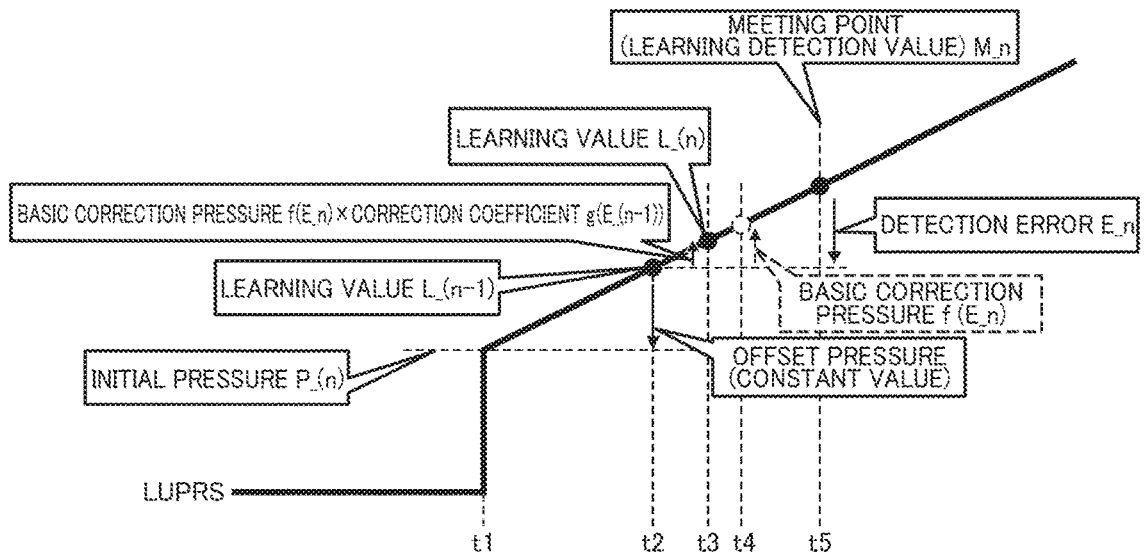
FIG. 11 is a time chart showing actions of learning detection for the second time onward (n-th time) when the lockup clutch shifts from disengaged state into engaged state while the vehicle is running, according to the first embodiment.

The following describes actions of updating of the learning value based on the normal learning determination when the meeting point detection pressure LUPRSEDGE (the learning detection value) is acquired as meeting point information, in sections "Actions of Initial Learning Detection: FIGS. 9 and 10", "Actions of Learning Detection for Second Time Onward: FIGS. 11 to 13", and "Illustrative Actions of Convergence of Learning Value to True Value: FIGS. 14 to 19".

(Actions of Initial Learning Detection: FIGS. 9 and 10)

In FIG. 9, when brake-off operation is made at a time instant t0, the LU command value (LUPRS) to lockup clutch 3 is set to obtain a standby pressure. When some time period has elapsed from time instant t0, and an accelerator pedal is depressed (APO>0), and the vehicle speed (VSP) reaches an L/U vehicle speed at a time instant t1, the LU command value (LUPRS) to lockup clutch 3 is set to obtain an initial pressure P.

The standby pressure is an oil pressure to prepare for start of stroke of lockup clutch 3, and charge a lockup hydraulic pressure circuit with working oil, without occurrence of L/U capacity. The initial pressure P is an oil pressure produced by an LU command value that is increased in a stepwise manner at start of LU engagement control such that stroke of lockup clutch 3 is completed within a predetermined time period, and is lower than the oil pressure at the meeting point, causing no L/U capacity. The initial pressure P is determined by an equation of [initial pressure P]=[meeting point M (=learning value L)]−[offset pressure]. The learning value L is set within a range from an upper limit to a lower limit possible due to hardware-side variation, and the learning initial value is set to the lower limit of the range of variation. The offset pressure is a constant value (conformable value for each accelerator opening) which determines a reduction of the initial pressure P away from the meeting point M.

After time instant t1, the LU command value (LUPRS) to lockup clutch 3 is increased at a predetermined gradient (conformable value). In a situation where the LU command value (LUPRS) at a time instant t2 is equal to the memorized learning initial value L_0, but the LU command value (LUPRS) at time instant t4 is detected as learning detected value M_1 at the meeting point, the initial detection error E_1 is determined by an equation of [initial detection error E_1]=[learning initial value L_0]−[learning detected value M_1].

As shown in FIG. 10, basic correction pressure f(E_1) with respect to initial detection error E_1 is a limited maximum learning value correction quantity, and a new learning value L_1 is obtained by an equation of [new learning value L_1]=[learning initial value L_0]+[basic correction pressure f(E_1)]. The LU command value (LUPRS) at time instant t3 is set to new learning value L_1, and the update operation is performed to update the learning initial value L_0 to new learning value L_1, and new learning value L_1 is thus memorized. The initial pressure P_1 for the next LU engagement control is determined by an equation of [next initial pressure P_1]=[learning value L_1]−[offset pressure].

(Actions of Learning Detection for Second Time Onward: FIGS. 11 to 13)

In FIG. 11, a time instant t1 is a time instant at which commanding of the last initial pressure P_(n−1) is issued. A time instant t2 is a time instant at which the last learning value L_(n−1) is reached. A time instant t3 is a time instant at which the present learning value L_(n) based on application of correction coefficient g(E_(n−1)) is reached. A time instant t4 is a time instant at which the present learning value L_(n) without application of correction coefficient g(E_(n−1)) is reached. A time instant t5 is a time instant at which the present learning detected value M_n is reached.

After time instant t1, the LU command value (LUPRS) to lockup clutch 3 is increased at a predetermined gradient (conformable value). In a situation where the LU command value (LUPRS) at time instant t2 is equal to the memorized learning value L_(n−1), but the LU command value (LUPRS) at time instant t5 is detected as learning detected value M_n at the meeting point, the detection error E_n for the n-th time is determined by an equation of [n-th detection error E_n]=[last learning value L_(n−1)]−[learning detected value M_n].

When the present detection error E_n and the last detection error E_n−1 are in the same direction (the same sign), basic correction pressure f(E_n) is set based on the present detection error E_n, and is limited depending on the magnitude of the present detection error E_n, as shown in FIG. 12. The correction coefficient g(E_(n−1)) is set based on the last detection error E_n−1 such that correction coefficient g(E_(n−1)) becomes smaller as the absolute value of the last detection error E_n−1 decreases, as shown in FIG. 13. The present learning value L_n is determined by an equation of [present learning value L_n]=[last learning value L_n−1]+[basic correction pressure f(E_n)]·[correction coefficient g(E_(n−1))]. The present learning value L_n is equal to the LU command value (LUPRS) at time instant t3 in FIG. 11. The present learning value L_n is set to the LU command value (LUPRS) at time instant t3, and the last learning value L_(n−1) is updated by the present learning value L_n, and the learning value L_n is thus memorized. Without application of correction coefficient g(E_(n−1)), the present learning value L_n is equal to the LU command value (LUPRS) at time instant t4 in FIG. 11. For the next LU engagement control, the initial pressure P_(n+1) is determined by an equation of [next initial pressure P_(n+1)]=[present learning value L_n]−[offset pressure].

On the other hand, when the present detection error E_n and the last detection error E_n−1 are in different directions (different signs), the learning value correction quantity is set to zero, to maintain the learning value unchanged by an equation of [the present learning value L_n]=[the last learning value L_n−1].

In this way, learning value L_n of the meeting point is updated, and in response to a next LU engagement request for engaging the disengaged lockup clutch 3, the LU command value is increased by one stroke to the next initial pressure P_(n+1). Thereafter, the LU engagement control is performed to increase the LU command value, which is raised to the next initial pressure P_(n+1), at a gradient with which lockup shocking is suppressed. This LU engagement control serves to set a time period from LU engagement request to occurrence of clutch transmission torque to a short constant time period, even with variation in manufacturing and variation in time, ensuring a stable response of engagement of lockup clutch 3.

(Illustrative Actions of Convergence of Learning Value to True Value: FIGS. 14 to 19)

Figure 14:
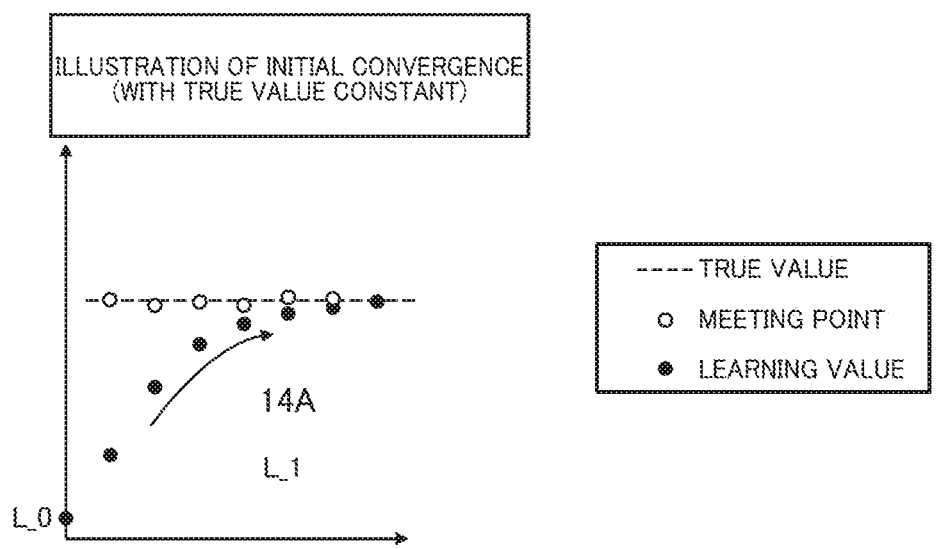
FIG. 14 is an illustration of initial convergence with a true value constant, showing a relationship between the meeting point and the learning value with respect to the number of learning operations according to the first embodiment.

Initial convergence of the learning value (with the true value constant) is not implemented by a single update of the learning value toward the meeting point, but by smooth convergence of the learning value to the true value with preferable response (see FIG. 14). In an initial stage of the learning, learning values are apart from the true value in the same direction. Accordingly, the learning value L_1 next to the learning initial value L_0 is calculated by addition of the basic correction pressure f(E_1), which is the maximum learning value correction quantity, to the learning initial value L_0. For the following learning value L_n, the quantity of {[basic correction pressure f(E_n)]·[correction coefficient g(E_(n−1))]} is added to the last learning value L_n−1, because the present detection error E_n and the last detection error E_n−1 are in the same direction (same sign). The correction quantity of the learning value per one time is limited to the maximum learning value correction quantity (about 10 kPa, for example) in the initial stage of the learning, and is set to decrease gradually as the number of learning operations increases. By this process, during initial convergence with the true value constant, the learning value converges to the true value with preferable response by initial learning operations, and as the number of learning operations increases, smooth convergence is made based on the present detection error E_n and the last detection error E_n−1, as shown in FIG. 14.

Figure 15:
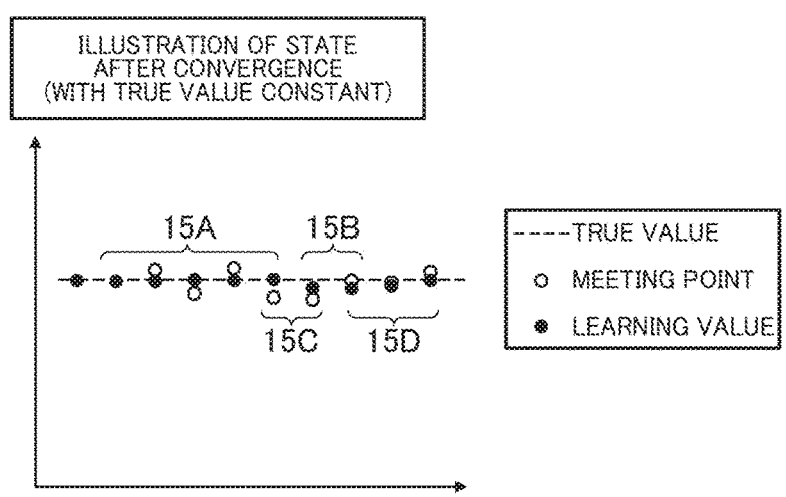
FIG. 15 is an illustration of stable state after convergence with the true value constant, showing a relationship between the meeting point and the learning value with respect to the number of learning operations according to the first embodiment.

In a situation of stable state after convergence of the learning value (with the true value constant), correction of the learning value is performed only when the present detection error E_n and the last detection error E_n−1 are in the same direction (same sign), as shown in FIG. 15. When the meeting point (learning detection value) changes up and down ($E\_n$ and $E\_n-1$ having different signs) as indicated by 15A, 15B, the last learning value is maintained unchanged. When the meeting point (learning detection value) is detected on the same side continuously ($E\_n$ and $E\_n-1$ having the same sign) as indicated by 15C, 15D, the learning value is corrected based on the present detection error $E\_n$ and the last detection error $E\_n-1$. Since the present detection error $E\_n$ and the last detection error $E\_n-1$ are small, basic correction pressure $f(E\_n)$ and correction coefficient $g(E\_(n-1))$ are set small. Accordingly, after convergence without change of the true value, the learning value is stable at or close to the true value, because the last learning value is maintained unchanged unless the meeting point (learning detection value) is detected on the same side continuously.

Figure 16:
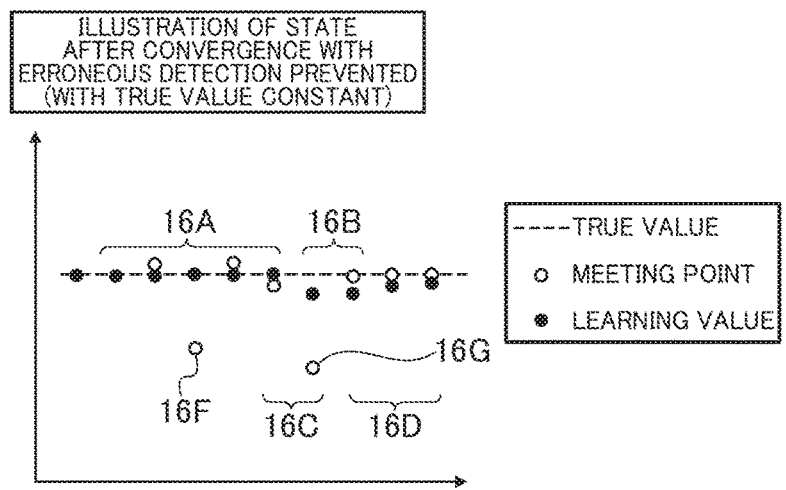
FIG. 16 is an illustration of state after convergence with erroneous detection prevented and the true value constant, showing a relationship between the meeting point and the learning value with respect to the number of learning operations according to the first embodiment.

In a situation of state after convergence of the learning value with erroneous detection prevented (with the true value constant), the guard function works against a single erroneous detection, as shown in FIG. 16. When the meeting point (learning detection value) changes up and down ($E\_n$ and $E\_n-1$ having different signs) as indicated by 16A, the last learning value is maintained unchanged. A point 16F is apparently a meeting point (learning detection value) based on erroneous detection, but is not a basis for the learning, because the sign of this meeting point is different from those of the previous and next meeting points. When the meeting point (learning detection value) is detected on the same side continuously ($E\_n$ and $E\_n-1$ having the same sign) as indicated by 16C, the learning value is corrected based on the present detection error $E\_n$ and the last detection error $E\_n-1$. A point 16G is apparently a meeting point (learning detection value) based on erroneous detection. The present detection error $E\_n$ is large but the last detection error $E\_n-1$ is small so that correction coefficient $g(E\_(n-1))$ is set small, whereas the meeting point (learning detection value) changes up and down as indicated by the next situation 16B so that the last learning value is maintained unchanged. When the meeting point (learning detection value) is detected on the same side continuously ($E\_n$ and $E\_n-1$ having the same sign) as indicated by 16D, the learning value is corrected wherein basic correction pressure $f(E\_n)$ and correction coefficient $g(E\_(n-1))$ are set small based on the present detection error $E\_n$ and the last detection error $E\_n-1$. Accordingly, in a situation where a meeting point (learning detection value) based on erroneous detection appears solely after convergence of the learning value as shown in FIG. 16, the erroneous detection is prevented from affecting the learning value.

Figure 17:
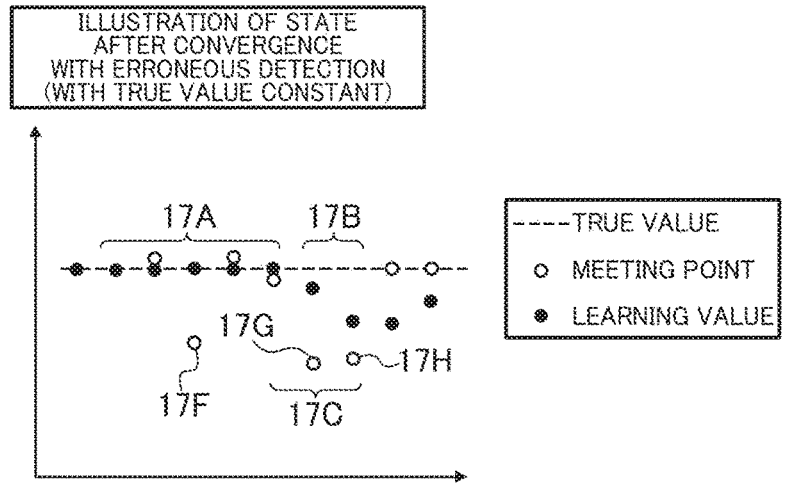
FIG. 17 is an illustration of state after convergence with erroneous detection with the true value constant, showing a relationship between the meeting point and the learning value with respect to the number of learning operations according to the first embodiment.

In a situation of state after convergence of the learning value with erroneous detection (with the true value constant), the guard function does not work against two or more erroneous detections, as shown in FIG. 17. When the meeting point (learning detection value) changes up and down ($E\_n$ and $E\_n-1$ having different signs) as indicated by 17A, the last learning value is maintained unchanged. A point 17F is apparently a meeting point (learning detection value) based on erroneous detection, but is not a basis for the learning, because the sign of this meeting point is different from those of the previous and next meeting points. When the meeting points (learning detection value) 17G, 17H, which are apparently based on erroneous detection, are detected on the same side continuously ($E\_n$ and $E\_n-1$ having the same sign) as indicated by 17C, the erroneous detection about the point 17G is prevented from affecting the learning value. However, with regard to the point 17H, both of the present detection error $E\_n$ and the last detection error $E\_n-1$ are large so that the erroneous detection is not suppressed from affecting the learning value. In this way, in a situation where meeting points based on erroneous detection appear after convergence of the learning value, if meeting points based on erroneous detection appear continuously during learning experience as shown in FIG. 17, the erroneous detection is not prevented from affecting the learning value. After a shift from a meeting point based on erroneous detection to a meeting point based on normal detection, the learning value converges again toward the true value with preferable response.

Figure 18:
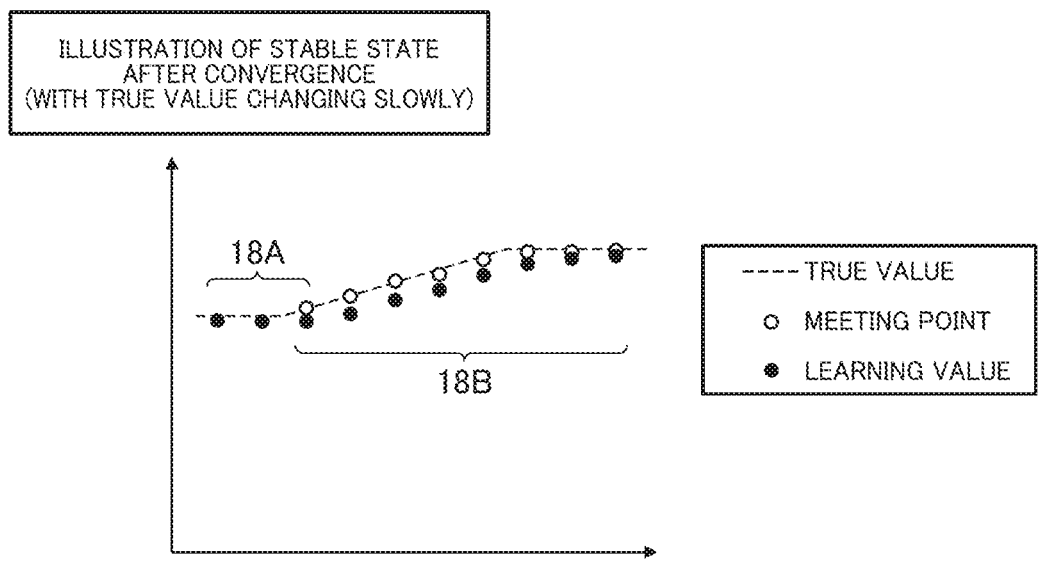
FIG. 18 is an illustration of stable state after convergence with the true value changing slowly, showing a relationship between the meeting point and the learning value with respect to the number of learning operations according to the first embodiment.

In a situation of stable state after convergence of the learning value (with the true value changing slowly), the learning value follows the true value changing slowly as shown in FIG. 18. While the true value changes slowly from a lower state indicated by 18A to a higher state indicated by 18B, the present detection error $E\_n$ and the last detection error $E\_n-1$ are in the same direction (same sign), and the present detection error $E\_n$ and the last detection error $E\_n-1$ are small. Accordingly, the learning value $L\_n$ increases gradually as the number of learning operations increase, wherein the learning value $L\_n$ is calculated by addition of {[basic correction pressure $f(E\_n)$]·[correction coefficient $g(E\_(n-1))$]} to the last learning value $L\_n-1$, wherein the basic correction pressure $f(E\_n)$ and the correction coefficient $g(E\_(n-1))$ are small. Accordingly, as the true value changes slowly, the learning value follows the true value changing slowly as shown in FIG. 18.

Figure 19:
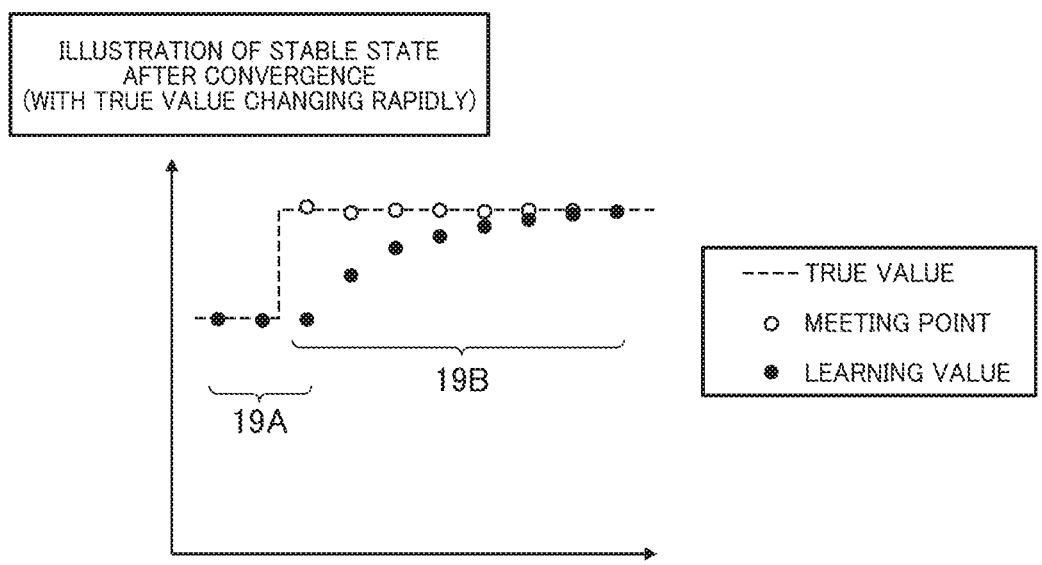
FIG. 19 is an illustration of stable state after convergence with the true value changing rapidly, showing a relationship between the meeting point and the learning value with respect to the number of learning operations according to the first embodiment.

In a situation of stable state after convergence of the learning value (with the true value changing rapidly), the learning value converges quickly and smoothly to the true value changing rapidly as shown in FIG. 19. While the true value changes rapidly from a lower state indicated by 19A to a higher state indicated by 19B, the learning value is far apart from the true value in an initial stage of the rapid change of the true value. After the rapid change of the true value, the present detection error $E\_n$ and the last detection error $E\_n-1$ are in the same direction (same sign), the learning value $L\_n$ is calculated by addition of {[basic correction pressure $f(E\_n)$]·[correction coefficient $g(E\_(n-1))$]} to the last learning value $L\_n-1$. The correction quantity of the learning value per one time is limited to the maximum learning value correction quantity (about 10 kPa, for example), and is set to decrease gradually as the number of learning operations increases. In this way, in a situation where the true value changes rapidly, the learning value converges to the true value quickly by initial learning operations, and as the number of learning operations increases thereafter, the learning value converges to the true value smoothly depending on the present detection error $E\_n$ and the last detection error $E\_n-1$, as shown in FIG. 19.

[Learning Value Update by Capacity Excess Detection (Confirmation) Determination]

Figure 20:
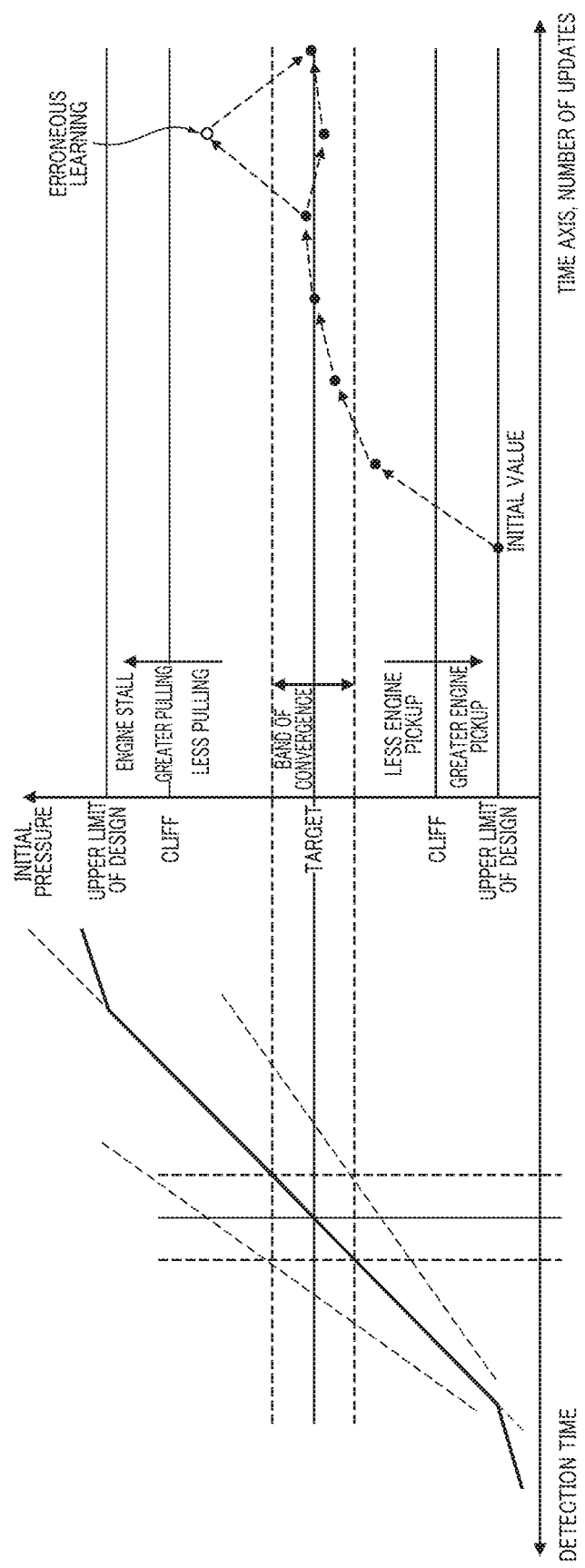
FIG. 20 is a diagram showing characteristics of the initial pressure with respect to detection time, and characteristics of change of the learning value with respect to time axis (number of updates) according to the first embodiment.
Figure 21:
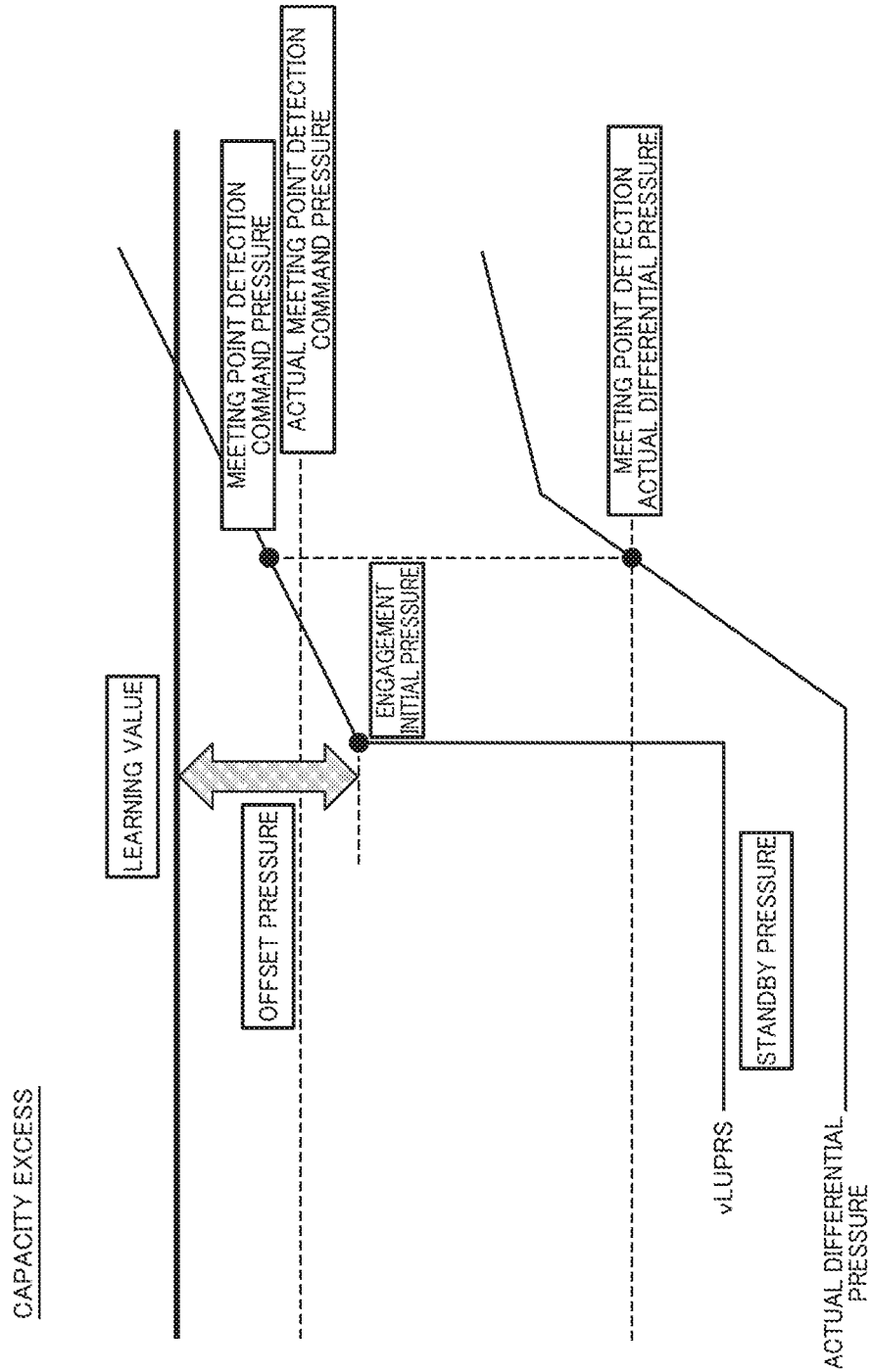
FIG. 21 is a time chart showing characteristics of learning value, offset pressure, lockup command pressure, and actual differential pressure when an engagement initial pressure is in state of capacity excess, wherein the engagement initial pressure is obtained by subtracting the offset pressure from the learning value, according to the first embodiment.

By the present learning control, the learning value is updated to converge toward the true value of the meeting point from a capacity-cleared side. If the learning value enters a capacity excess side due to erroneous learning and movement of the meeting point, engagement initial pressure may cause a rapid engagement, and thereby cause shocks, engine stalling, and a rapid decrease of engine rotation. The term "erroneous learning" is used to indicate a situation where the learning value deviates discontinuously from a band of convergence as shown in FIG. 20. The term "meeting point movement" is used to indicate a situation where the true value of the meeting point changes due to change of characteristics of components, for example, when engagement is performed after the vehicle is left for a long time period.

Accordingly, it is required to provide a capacity excess determination logic with which the learning value can be significantly reduced before an unbearable shock occurs. It is to be noted that it is required to refrain from this detection during normal convergence, because it is impossible to stabilize the learning value at an aimed value of convergence if this detection is frequently performed. It is therefore desired to prevent the capacity excess determination logic from being activated under normal condition, to cause the normal learning determination logic to achieve normal convergence, while changing the learning value back to a normal value before entrance into an unbearable shock possible region. The term "capacity excess" is used to indicate a situation where the engagement initial pressure is too close to a point to be detected, and response of the actual differential pressure is late, causing a relationship of [meeting point detection command pressure]>[actual meeting point detection command pressure]. If the amount of deviation by capacity excess is small, it is less problematic because the learning value falls gradually as the learning progresses.

For that purpose, the first embodiment employs the capacity excess determination logic. The capacity excess determination logic is configured to determine whether the engagement initial pressure is in state of capacity excess, as follows. It monitors the lockup transmission torque, and when the lockup transmission torque rises rapidly, determines that the engagement initial pressure is in state of capacity excess. Conversely, when the lockup transmission torque rises at a valid rate of increase (corresponding to the command pressure), it is appropriate to determine that the engagement initial pressure is not in state of capacity excess. The reason why the lockup transmission torque is selected as a parameter to be monitored, is that the stroke of lockup clutch 3 can be determined.

Figure 22:
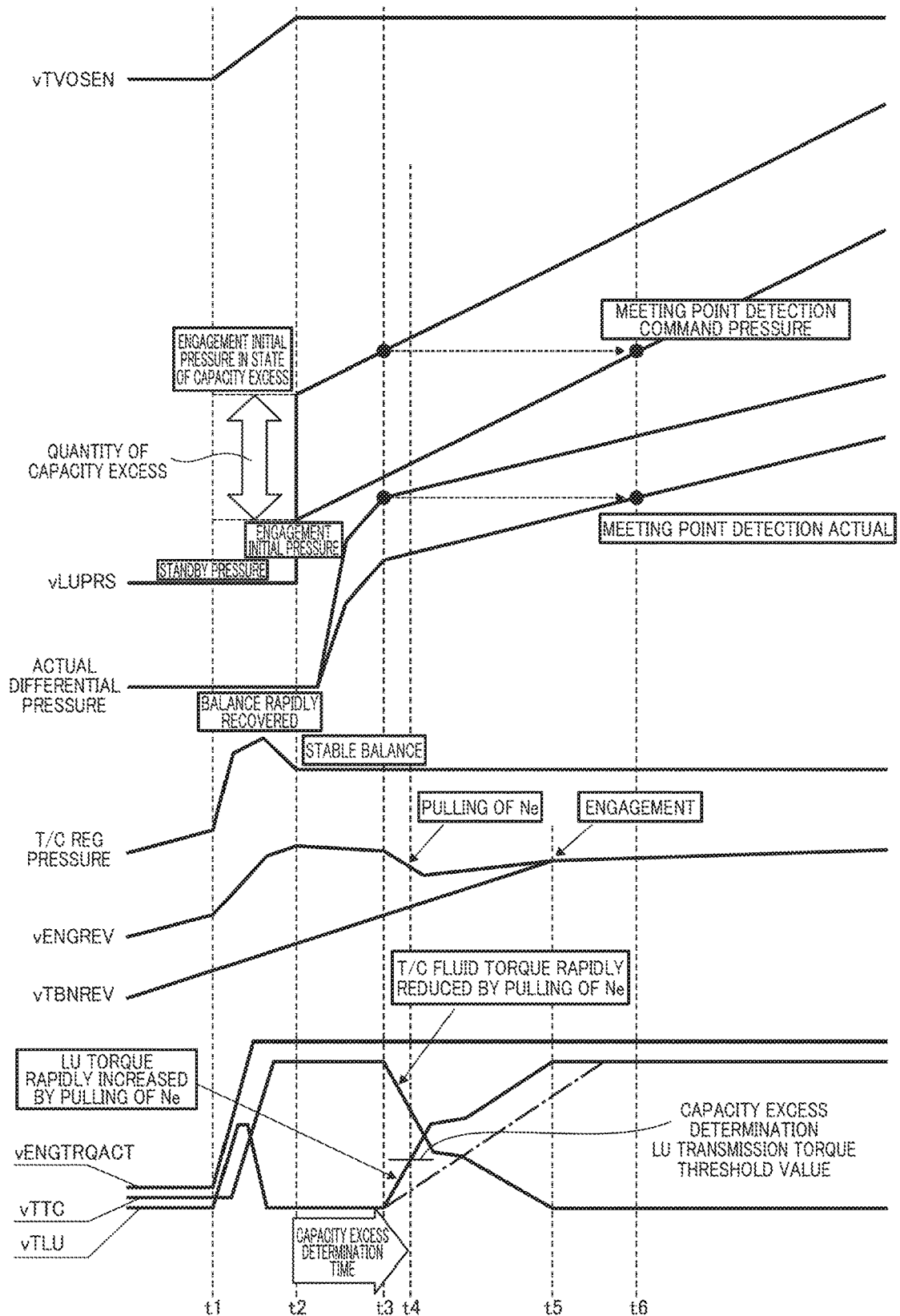
FIG. 22 is a time chart showing characteristics of throttle opening sensor value, lockup command pressure, actual differential pressure, torque converter regulator pressure, engine rotational speed, turbine rotational speed, torque converter fluid torque, and lockup torque when the lockup clutch engaged by the engagement initial pressure in state of capacity excess, according to the first embodiment.

Specifically, as shown in a time chart of FIG. 22, when the engagement initial pressure is set to a value for state of capacity excess at a time instant t2, engine pulling starts to reduce the engine rotational speed at a time instant t3 when the meeting point is reached, so that the LU torque rises rapidly due to engine pulling. During a period of capacity excess determination from time instant t2, at which the engagement initial pressure is commanded, to a time instant t4, the LU torque exceeds the capacity excess determination LU transmission torque threshold value. In FIG. 22, a time instant t1 is a time instant when depression of the accelerator is started, and a time instant t5 is a time instant when engagement of lockup clutch 3 is completed, and a time instant t6 is a time instant when the meeting point is detected when the engagement initial pressure is suitable.

The process for situation of detection of capacity excess in the capacity excess determination logic may be implemented by resetting the learning, or significantly reducing the learning value, or reducing the learning value variably. In the first embodiment, with attention to a fact that the determination of capacity excess can be caused by erroneous learning and by meeting point movement, it is configured to correspond to these causes, and give different learning value correction quantities depending on whether capacity excess detection is done only once or continuously.

Specifically, when capacity excess detection is done only once, it calculates the learning value correction quantity for state of detection of capacity excess (the maximum value in the normal learning determination logic), and reduces the present learning value by the learning value correction quantity for state of detection of capacity excess. This serves to prevent one-time erroneous learning from causing the learning value to enter the unbearable shock possible region. On the other hand, when capacity excess detection is done continuously (without insertion of learning value correction based on the normal learning determination logic), it calculates the learning value correction quantity for state of confirmation of capacity excess (several times the maximum value in the normal learning determination logic), and reduces the present learning value by the learning value correction quantity for state of confirmation of capacity excess. This serves to prevent the learning value from entering the unbearable shock possible region due to meeting point movement.

[Characteristic Actions of Meeting Point Learning Control]

In the first embodiment, when lockup clutch 3 experiences a transition into engaged state while the vehicle is running, a state of clutch capacity excess is detected in response to a situation where the LU transmission torque estimated value exceeds the capacity excess determination transmission torque threshold value in the predetermined time period after commanding of the initial pressure P_n based on the learning value L_n. In response to detection of the state of clutch capacity excess, the operation of learning value correction is performed to reduce the learning value L_n. While the LU transmission torque is monitored, it is assumed that the initial pressure is excessive if the LU transmission torque increases rapidly, and it is assumed that the initial pressure is not excessive if the LU transmission torque increases at a valid rate of increase. Accordingly, the LU transmission torque estimated value is used to detect a state of clutch capacity excess, in response to a situation where the LU transmission torque estimated value exceeds the capacity excess determination transmission torque threshold value within the predetermined time period after commanding of the initial pressure P_n based on the learning value L_n. The capacity excess determination logic is employed wherein in response to detection of the state of clutch capacity excess, the learning value correction is performed to reduce the learning value before entrance into the unbearable shock possible region. This serves to prevent the initial pressure P_n, which is supplied to lockup clutch 3, from causing a state of capacity excess, when the learning control is performed based on the information of the meeting point at which lockup clutch 3 starts torque transmission.

In the first embodiment, when the state of clutch capacity excess is first detected, the learning value correction quantity for state of detection of capacity excess is set to about the maximum value of the learning value correction quantity during the meeting point learning control. The learning value correction quantity for state of detection of capacity excess is subtracted from the memorized learning value L_n for updating the learning value. If the learning value is significantly reduced for cancellation of the state of capacity excess when the state of clutch capacity excess is first detected, wherein the state of capacity excess is caused by erroneous learning, it is thereafter required to experience many learning operations for convergence of the meeting point to the true value. If the learning value is not reduced for correction when the state of clutch capacity excess is first detected, wherein the state of capacity excess is caused by movement of the meeting point, it may cause entrance into the unbearable shock possible region. The feature that when the state of clutch capacity excess is first detected, the learning value is reduced by about the maximum value of the learning value correction quantity, serves to prevent entrance into the unbearable shock possible region, when the clutch capacity excess is caused by one-time erroneous learning.

In the first embodiment, when the state of clutch capacity excess is detected at the predetermined number of continuous detections, the learning value correction quantity for state of confirmation of capacity excess is set greater than the learning value correction quantity for state of detection of capacity excess. The learning value correction quantity for state of confirmation of capacity excess is subtracted from the learning value L_n for updating the learning value. When the detections of state of capacity excess is repeated even with the reduction of the learning value in response to the first detection of state of capacity excess, it can be estimated that the clutch capacity excess is caused by movement of the meeting point. The feature that when the state of clutch capacity excess is detected continuously, the learning value is reduced significantly, serves to prevent entrance into the unbearable shock possible region, when the clutch capacity excess is caused by movement of the meeting point.

In the first embodiment, the capacity excess determination logic (FIG. 6) and the normal learning determination logic (FIG. 7) are performed in parallel, wherein the capacity excess determination logic is to calculate the learning value correction quantity upon detection of clutch capacity excess, and the normal learning determination logic is to calculate the learning value correction quantity based on detection error E_n between learning detected value M_n and learning value L_n. For updating the learning value L_n, if both of the learning value correction quantity from the capacity excess determination logic (FIG. 6) and the learning value correction quantity from the normal learning determination logic (FIG. 7) are calculated simultaneously, the learning value correction quantity from the capacity excess determination logic (FIG. 6) is selected for updating, prior to the other. The normal learning determination logic serves to cause by multiple learning experiences the learning value to converge from the capacity-cleared side toward the true value of the meeting point. On the other hand, the capacity excess determination logic is required to suitably respond to detection of entrance of the learning value into the capacity excess side, because it is possible to cause a rapid engagement of lockup clutch 3 and thereby cause shocks. The feature that if both of the learning value correction quantity from the capacity excess determination logic (FIG. 6) and the learning value correction quantity from the normal learning determination logic (FIG. 7) are calculated simultaneously, the learning value correction quantity from the capacity excess determination logic (FIG. 6) is selected for updating prior to the other, serves to prevent quickly entrance into the unbearable shock possible region.

In the first embodiment, when lockup clutch 3 shifts from disengaged state into engaged state while the vehicle is running, the LU transmission torque is estimated based on the difference between the engine torque (engine torque signal value Te) and the torque converter transmission torque ($\tau \cdot N^2$). The meeting point detection pressure LUPRSEDGE when it is determined that the lockup transmission torque estimated value enters a tendency of increase, is used as meeting point information for the meeting point learning control. While the vehicle is running, change of the engine rotational speed causes a change of the transmission torque of torque converter 4, and a change of the transmission torque of lockup clutch 3. However, the meeting point detection pressure LUPRSEDGE is an oil pressure at which the lockup transmission torque estimated value enters a tendency of increase and which is estimated based on the difference between the engine torque (engine torque signal value Te) and the torque converter transmission torque ($\tau \cdot N^2$); namely, the meeting point detection pressure LUPRSEDGE is an oil pressure with which the transmission torque of lockup clutch 3 is in a state maintained from decreasing. The feature that learning value L_n is determined based on the meeting point information that is the meeting point detection pressure LUPRSEDGE when it is determined that the lockup transmission torque estimated value enters a tendency of increase, serves to prevent erroneous detection. When lockup clutch 3 undergoes the lockup engagement control for transition from disengaged state into engaged state while the vehicle is running, the process of meeting point learning control is started. This serves to prevent erroneous learning while ensuring the frequency of learning, when performing the learning control based on the information of the meeting point at which lockup clutch 3 starts torque transmission.

The following describes effects. The lockup clutch control device and lockup clutch control method applied to the engine vehicle according to the embodiment produces the following listed effects.

<1> For a vehicle where a torque converter (4) is mounted between an engine (1) and a transmission (continuously variable transmission 6), wherein the torque converter (4) includes a lockup clutch (3), it includes: a lockup control means (lockup control part 12b, FIG. 3) configured to control engagement of the lockup clutch (3); and a meeting point learning control means (meeting point learning control part 12c, FIGS. 4 to 7) configured to perform a learning control of obtaining a learning value (L) based on information about a meeting point at which the lockup clutch (3) starts torque transmission, wherein the meeting point learning control means (meeting point learning control part 12c, FIGS. 4 to 7) is further configured to: calculate a lockup transmission torque estimated value (LU transmission torque estimated value) based on a difference between an engine torque (engine torque signal value Te) and a torque converter transmission torque ($\tau \cdot N^2$), when the lockup clutch (3) experiences a transition into engaged state while the vehicle is running; detect a state of clutch capacity excess, in response to a situation where the lockup transmission torque estimated value (LU transmission torque estimated value) exceeds a capacity excess determination transmission torque threshold value in a predetermined time period after commanding of an initial pressure (P_n) based on the learning value (L_n); and perform an operation of learning value correction of reducing the learning value (L_n) in response to detection of the state of clutch capacity excess (FIG. 6). This serves to suppress the initial pressure (P_n), which is supplied to the lockup clutch (3), from causing a state of capacity excess, during the learning control based on the information of the meeting point at which the lockup clutch (3) starts torque transmission.

<2> The meeting point learning control means (meeting point learning control part 12c, FIGS. 4 to 7) is further configured to: set a quantity of learning value correction for situation of detection of the state of clutch capacity excess to about a maximum value of the quantity of learning value correction during the learning control for the meeting point, in response to a first detection of the state of clutch capacity excess (S25 to S27 in FIG. 6); and update the learning value (L_n) by subtracting the set quantity of learning value correction from the learning value (L_n) memorized (S37 to S38 in FIG. 7). In addition to the effect of <1>, this serves to reduce the learning value by about the maximum value of the learning value correction quantity in response to the first detection of clutch capacity excess, and thereby prevent entrance into the unbearable shock possible region, when the clutch capacity is caused by one-time erroneous learning.

<3> The meeting point learning control means (meeting point learning control part 12c, FIGS. 4 to 7) is further configured to: set a quantity of learning value collection for situation of confirmation of the state of clutch capacity excess, greater than the quantity of learning value correction for situation of detection of the state of clutch capacity excess, in response to a predetermined number of continuous detections of the state of clutch capacity excess (S25 to S26 in FIG. 6); and update the learning value (L_n) by subtracting the set quantity of learning value correction from the learning value (L_n) memorized (S37 to S38 in FIG. 7). In addition to the effect of <2>, this serves to reduce the learning value (L_n) significantly in response to detection of continuous detections of clutch capacity excess, and thereby prevent entrance into the unbearable shock possible region, when the clutch capacity excess is caused by movement of the meeting point.

<4> The meeting point learning control means (meeting point learning control part 12c, FIGS. 4 to 7) is further configured to: perform a capacity excess determination logic (FIG. 6) of detecting the state of clutch capacity excess and calculating a quantity of learning value correction, in parallel to a normal learning determination logic (FIG. 7) of calculating a quantity of learning value correction based on an error of detection (E_n) between a learning detected value (M_n) and the learning value (L_n); and when the quantity of learning value correction based on the capacity excess determination logic (FIG. 6) and the quantity of learning value correction based on the normal learning determination logic (FIG. 7) are calculated in parallel, update the learning value (L_n) by the quantity of learning value correction based on the capacity excess determination logic, selected with higher priority than the quantity of learning value correction based on the normal learning determination logic (S37 in FIG. 7). In addition to the effects of <1> to <3>, this serves to quickly prevent entrance into the unbearable shock possible region, by selecting the learning value correction quantity from the capacity excess determination logic which requires an urgency, when the learning value correction quantities are calculated simultaneously.

<5> The lockup control means (lockup control part 12b, FIG. 3) is further configured to calculate the initial pressure (P_(n+1)) for next supply to the lockup clutch (3) for engagement of the lockup clutch (3), by subtracting an offset pressure from the learning value (L_n) currently obtained by the meeting point learning control means (meeting point learning control part 12c, FIGS. 4 to 7). In addition to the effects of <1> to <4>, this serves to set a time period, which is required from LU engagement request to occurrence of the clutch transmission torque, to a short constant time period, even with variation in manufacturing and variation in time, and thereby ensure a stable response of engagement of the lockup clutch (3). In particular, the feature of setting of the initial pressure (P_(n+1)) with offset from learning value (L_n), serves to prevent the initial pressure (P_(n+1)) from becoming greater than engagement pressure of the lockup clutch (3), and thereby suppress behavior of the vehicle from fluctuating due to rapid engagement of the lockup clutch (3).

<6> The meeting point learning control means (meeting point learning control part 12c, FIGS. 4 to 7) is further configured to calculate as the learning detected value (M_n) a meeting point detected pressure when calculating the lockup transmission torque estimated value (LU transmission torque estimated value) based on the difference between the engine torque (engine torque signal value Te) and the torque converter transmission torque ($\tau \cdot N^2$) (S1 in FIG. 4), and determining that the lockup transmission torque estimated value (LU transmission torque estimated value) has entered a tendency to increase (S18 in FIG. 5). In addition to the effects of <1> to <5>, this serves to prevent erroneous learning while ensuring the frequency of learning, during the learning control based on the information of the meeting point at which the lockup clutch (3) starts torque transmission.

Although the vehicular lockup clutch control device and vehicular lockup clutch control method according to the present invention has been described with reference to the first embodiment as described above, specific configuration of the present invention is not limited to the embodiment, but may be carried out with design modification and addition without going out of the substance of the present invention related to the present claims.

The first embodiment has the exemplified configuration that meeting point learning control part 12c is configured to perform the learning control to obtain the learning value L_n of the meeting point of the LU command value, wherein meeting point detection pressure LUPRSEDGE is information about the meeting point at which lockup clutch 3 starts torque transmission. However, meeting point learning control part 12c may be configured to perform a learning control to obtain a learning value of an initial pressure of the LU command value, wherein meeting point detection pressure LUPRSEDGE is information about the meeting point. The learning control may be configured to obtain a learning value of the gradient of the LU command value. The learning control may be configured to obtain a learning value of an initial pressure and a learning value of the gradient of the LU command value.

The first embodiment has the exemplified configuration that meeting point learning control part 12c is configured to obtain the learning value L based on meeting point detection pressure LUPRSEDGE, when it is determined that the result of testing based on meeting point estimated pressure LUPRSEDGE # is valid. However, meeting point learning control part 12c may be configured to perform testing based on a condition other than meeting point estimated pressure, such as a difference from the memorized meeting point learning value, and when it is determined that the result of testing is valid, obtain a learning value based on meeting point detection pressure. Furthermore, meeting point learning control part 12c may be configured to obtain a learning value based on meeting point detection pressure in response to a satisfaction of the learning value update permission condition, wherein the learning value update permission condition is set strict to omit the testing.

The first embodiment has the exemplified configuration that meeting point learning control part 12c is configured to differentiate the learning value correction quantity for state of detection of capacity excess when the clutch capacity excess is first detected, from the learning value correction quantity for state of confirmation of capacity excess when the clutch capacity excess is detected continuously. However, meeting point learning control part 12c may be configured to reduce the learning value by a predetermined quantity to avoid the capacity excess irrespective of the form of detection and the number of detections, when the clutch capacity excess is detected.

The first embodiment has the exemplified configuration that the lockup clutch control device and lockup clutch control method according to the present invention are applied to the engine vehicle where the continuously variable transmission is mounted. However, the lockup clutch control device and lockup clutch control method according to the present invention may be applied to a vehicle such as a hybrid vehicle where an engine is mounted as a drive source, wherein the transmission may be a step-shift automatic transmission configured to automatically perform step-shifting. Namely, the present invention may be applied to a vehicle where a torque converter is mounted between an engine and a transmission, wherein the torque converter includes a lockup clutch.

The invention claimed is:

1. A vehicular lockup clutch control device for a vehicle in which a torque converter is mounted between an engine and a transmission, wherein the torque converter includes a lockup clutch, the vehicular lockup clutch control device comprising:
a control unit configured to control engagement of the lockup clutch and to perform a learning control when the lockup clutch shifts into an engaged state while the vehicle is running, wherein the control unit is configured to:
calculate a lockup transmission torque estimated value based on a difference between an engine torque and a torque converter transmission torque;
obtain a learning value of an initial pressure as a hydraulic pressure command value at a start of the control of engagement of the lockup clutch, based on an elapsed time period from an event of commanding of the initial pressure to an event that the lockup transmission torque estimated value exceeds a capacity excess determination transmission torque threshold value;
detect a state of clutch capacity excess, and perform an operation of a learning value correction of reducing the learning value, in response to a situation where the lockup transmission torque estimated value exceeds the capacity excess determination transmission torque threshold value in a predetermined time period after commanding of the initial pressure;
set a quantity of the learning value correction for detection of the state of clutch capacity excess, depending on a maximum value of the quantity of the learning value correction during the learning control, in response to a first detection of the state of clutch capacity excess; and
update the learning value by subtracting the set quantity of the learning value correction from the learning value obtained.

2. The vehicular lockup clutch control device as claimed in claim 1, wherein the control unit is further configured to:
set the quantity of the learning value correction for detection of the state of clutch capacity excess to the maximum value of the quantity of the learning value correction during the learning control for a meeting point, in response to the first detection of the state of clutch capacity excess.

3. The vehicular lockup clutch control device as claimed in claim 1, wherein the control unit is further configured to:
set a quantity of the learning value correction for confirmation of the state of clutch capacity excess, which is greater than the quantity of the learning value correction for detection of the state of clutch capacity excess, in response to a predetermined number of continuous detections of the state of clutch capacity excess; and
update the learning value by subtracting the set quantity of the learning value correction from the learning value obtained.

4. The vehicular lockup clutch control device as claimed in claim 1, wherein the control unit is further configured to:
perform a capacity excess determination of detecting the state of clutch capacity excess and calculating a quantity of the learning value correction, in parallel to a first learning determination of calculating a quantity of the learning value correction based on an error of detection between a learning detected value and the learning value; and
when the quantity of the learning value correction based on the capacity excess determination and the quantity of the learning value correction based on the first learning determination are calculated in parallel, update the learning value by the quantity of the learning value correction based on the capacity excess determination, selected with higher priority than the quantity of the learning value correction based on the first learning determination.

5. The vehicular lockup clutch control device as claimed in claim 1, wherein the control unit is further configured to calculate the initial pressure for a next supply to the lockup clutch for engagement of the lockup clutch, by subtracting an offset pressure from the learning value currently obtained by the control unit.

6. The vehicular lockup clutch control device as claimed in claim 4, wherein the control unit is further configured to calculate, as the learning detected value, a meeting point detected pressure when calculating the lockup transmission torque estimated value based on the difference between the engine torque and the torque converter transmission torque, and determine that the lockup transmission torque estimated value has a tendency to increase.

7. A vehicular lockup clutch control method for a vehicle in which a torque converter is mounted between an engine and a transmission, wherein the torque converter includes a lockup clutch, the vehicular lockup clutch control method comprising:
controlling engagement of the lockup clutch by a control unit;
performing a learning control by the control unit when the lockup clutch shifts into an engaged state while the vehicle is running, wherein the learning control is configured to:
calculate a lockup transmission torque estimated value based on a difference between an engine torque and a torque converter transmission torque; and
obtain a learning value of an initial pressure as a hydraulic pressure command value at a start of the control of engagement of the lockup clutch, based on an elapsed time period from an event of commanding of the initial pressure to an event that the lockup transmission torque estimated value exceeds a capacity excess determination transmission torque threshold value;
detecting a state of clutch capacity excess, and performing an operation of a learning value correction of reducing the learning value, by the control unit, in response to a situation where the lockup transmission torque estimated value exceeds the capacity excess determination transmission torque threshold value in a predetermined time period after commanding of the initial pressure;

setting a quantity of the learning value correction for detection of the state of clutch capacity excess, depending on a maximum value of the quantity of the learning value correction during the learning control, in response to a first detection of the state of clutch capacity excess; and updating the learning value by subtracting the set quantity of the learning value correction from the learning value obtained.

8. The vehicular lockup clutch control method as claimed in claim 7, comprising:

setting the quantity of the learning value correction for detection of the state of clutch capacity excess to the maximum value of the quantity of the learning value correction during the learning control for a meeting point, in response to the first detection of the state of clutch capacity excess.

* * * * *